US010862101B2

(12) United States Patent
Moitzheim et al.

(10) Patent No.: US 10,862,101 B2
(45) Date of Patent: Dec. 8, 2020

(54) ION INSERTION BATTERY ELECTRODE AND METHOD OF FABRICATING SAME

(71) Applicants: IMEC vzw, Leuven (BE); Katholieke Universiteit Leuven, Leuven (BE); Nederlandse Organisatie voor toegepast-natuurwetenschappelijk onderzoek TNO, JE Den Haag (NL)

(72) Inventors: Sebastien Moitzheim, Leuven (BE); Philippe Vereecken, Liège (BE); Paul Poodt, AJ Deest (NL); Joan Elisabeth Balder, Edam (NL)

(73) Assignees: IMEC vzw, Leuven (BE); Katholieke Universiteit Leuven, Leuven (BE); Nedarlandse Organisatie voor toegepast-natuurwetenschappelijk onderzoek TNO, JE Den Haag (NL)

(*) Notice: Subject to any disclaimer, the term of this patent is extended or adjusted under 35 U.S.C. 154(b) by 23 days.

(21) Appl. No.: 16/238,455

(22) Filed: Jan. 2, 2019

(65) Prior Publication Data

US 2019/0157657 A1 May 23, 2019

Related U.S. Application Data

(63) Continuation of application No. PCT/EP2017/066417, filed on Jul. 3, 2017.

(30) Foreign Application Priority Data

Jul. 4, 2016 (EP) ...................................... 16177826

(51) Int. Cl.
*H01M 4/131* (2010.01)
*H01M 10/0525* (2010.01)
(Continued)

(52) U.S. Cl.
CPC ......... *H01M 4/131* (2013.01); *H01M 4/0407* (2013.01); *H01M 4/0428* (2013.01);
(Continued)

(58) Field of Classification Search
None
See application file for complete search history.

(56) References Cited

U.S. PATENT DOCUMENTS

2008/0131762 A1* 6/2008 Joo ........................ C01B 3/042
205/340
2009/0226816 A1* 9/2009 Yoshida .................. H01M 4/13
429/304

(Continued)

OTHER PUBLICATIONS

Aarik et al., "Effect of crystal structure on optical properties of $TiO_2$ films grown by atomic layer deposition", Thin Solid Films, Elsevier-Sequoia S.A. vol. 305, No. 1-2, Aug. 1, 1997, pp. 270-273.

(Continued)

*Primary Examiner* — Christopher P Domone
(74) *Attorney, Agent, or Firm* — Knobbe, Martens, Olson & Bear, LLP

(57) ABSTRACT

The disclosed technology relates to electrode layers of ion insertion type batteries and to electrode layer materials, wherein the electrode layer materials have a good electronic conductivity and a good ion conductivity, and wherein the electrode layers offer a good rate performance and a high storage capacity. The disclosed technology further relates to ion insertion type battery cells and batteries including such electrode layers, e.g., as an anode. The disclosed technology further relates to methods of forming such electrode layers and to methods for fabricating ion insertion type battery cells and batteries. The electrode layers according to the disclosed technology comprise titanium oxide comprising chlorine and may be deposited by atomic layer deposition at temperatures lower than 150° C.

20 Claims, 9 Drawing Sheets

(51) Int. Cl.
*H01M 4/04* (2006.01)
*H01M 4/485* (2010.01)
*H01M 4/1391* (2010.01)
*H01M 10/0562* (2010.01)
*H01M 4/1315* (2010.01)
*H01M 4/13915* (2010.01)
*H01M 4/02* (2006.01)
*H01M 6/40* (2006.01)

(52) U.S. Cl.
CPC ....... *H01M 4/0471* (2013.01); *H01M 4/1315* (2013.01); *H01M 4/1391* (2013.01); *H01M 4/13915* (2013.01); *H01M 4/485* (2013.01); *H01M 10/0525* (2013.01); *H01M 10/0562* (2013.01); *H01M 6/40* (2013.01); *H01M 2004/021* (2013.01); *H01M 2004/027* (2013.01)

(56) References Cited

U.S. PATENT DOCUMENTS

| 2011/0052994 | A1 | 3/2011 | Harada et al. | |
| 2014/0312269 | A1* | 10/2014 | Laumann | C01G 23/00 252/182.1 |
| 2015/0086809 | A1 | 3/2015 | Lemke et al. | |
| 2015/0162602 | A1* | 6/2015 | Dadheech | H01M 4/366 429/231.5 |

OTHER PUBLICATIONS

Ban et al., "Atomic layer deposition of amorphous TiO$_2$ on graphene as an anode for Li-ion batteries", Nanotechnology vol. 24 No. 42, Sep. 25, 2013, 6 pages.
Fang et al., "Comparison of the rate capability of nanostructured amorphous and anatase TiO$_2$ for lithium insertion using anodic TiO$_2$ nanotube arrays", Nanotechnology vol. 20 No. 22, May 13, 2009, 8 pages.
Sussman et al., "Engineering 3-D Electrodes with Enhanced Charge Storage Properties Based on Solution-Processed and Sintered Anatase Nanocrystal-Carbon Mesoporous Structures", Chem. Eng. 2015, 3, 2, 334-339.
Lui et al., "Flexible, three-dimensional ordered macroporous TiO$_2$ electrode with enhanced electrode-electrolyte interaction in high-power Li-ion batteries." Nano Energy 2016, 24, 72-77.
Wang et al., "Enhanced Performance of a Pillared TiO$_2$ Nanohybrid as an Anode Material for Fast and Reversible Lithium Storage" ChemNanoMat 2015, 1, 96.
Saravanan et al., "Mesoporous TiO2 with high packing density for superior lithium storage" Energy Environ. Sci. 2010, 3, 939-948.
Ye et al., "Structural Optimization of 3D Porous Electrodes for High-Rage Performance Lithium Ion Batteries" ACS Nano 2015, 9, 2, 2194-2202.
Y. Shen et al., "Growth of two-dimensional ultrathin anatase TiO$_2$ nanoplatelets on graphene for high-performance lithium-ion battery" Nanoparticle Res. 2013, 15, 1913-1921.
Jin et al., "Hierarchical architectures of TiO2 nanowires-CNT interpenetrating networks as high-rate anodes for lithium-ion batteries" Nanotechnology 2014, 25, 395401.
Cheng et al., "Conformal coating of TiO$_2$ nanorods on a 3-D CNT scaffold by using a CNT film as a nanoreactor: a free-standing and binder-free Li-ion anode" J. Mater. Chem. A 2014, 2, 2701-2707.
Xin et al., "Scalable synthesis of TiO2/graphene nanostructured composite with high-rate performance for lithium ion batteries" ACS Nano 2012, 6, 11035-11043.
Liu et al, "Sandwich-like, stacked ultrathin titanate nanosheets for ultrafast lithium storage" Adv. Mater. 2011, 23, 998-1002.
Li et al, Adv. "Battery performance and photocatalytic activity of mesoporous anatase TiO (2) nanospheres/graphene composites by template-free self-assembly" Funct. Mater. 2011, 21, 1717-1722.
Yang et al., "The power of Nb-substituted TiO$_2$ in Li-ion batteries: Morphology transformation induced by high concentration substitution" J. Power Sources 2015, 288, 401-408.
Zhang et al. "Improvements in the Electrochemical Kinetic Properties and Rate Capability of Anatase Titanium Dioxide Nanoparticles by Nitrogen Doping" ACS Appl. Mater. Interfaces 2014, 6, 4458-4465.
Samiee et al., J. "A facile nitridation method to improve the rate capability of TiO2 for lithium-ion batteries" Power Sources 2014, 245, 594-8.
Li et al., "High Substitution Rate in TiO2 Anatase Nanoparticles with Cationic Vacancies for Fast Lithium Storage" Chem. Mater. 2015, 27, 5014-5019.
Shin et al., "Oxygen-Deficient TiO$_{2-\delta}$ Nanoparticles via Hydrogen Reduction for High Rate Capability Lithium Batteries" J. Mater, Chem. Mater. 2012, 24, 543-551.
Li et al., "Atomic layer deposition derived amorphous TiO$_2$ thin film decorating graphene nanosheets with superior rate capability" Electrochem. commun. 2015, 57, 43-47.
Xie et al, "Amorphous Ultrathin TiO$_2$ Atomic Layer Deposition Films on Carbon Nanotubes as Anodes for Lithium Ion BatteriesBatteries and Energy Storage" J. Electrochem. Soc. 2015, 162, A974-A981.
Xiong et al., "Self-Improving Anode for Lithium-Ion Batteries Based on Amorphous to Cubic Phase Transition in TiO$_2$ Nanotubes" J. Phys. Chem. C 2012, 116, 3181-3187.
Wang et al., "Highly stable and flexible Li-ion battery anodes based on TiO$_2$ coated 3D carbon nanostructures" J. Mater. Chem. A 2015, 3, 15394-15398.
Xie et al, "High Power and High Capacity 3D-Structured TiO$_2$ Electrodes for Lithium-Ion Microbatteries" J. Electrochem. Soc. 2016, 163, A2385-A2389.
Eustache et al., "Silicon-Microtube Scaffold Decorated with Anatase TiO$_2$ as a Negative Electrode for a 3D Litium-Ion Microbattery" Adv. Energy Mater. 2014, 4, 1301612.
Létiche et al., "Atomic Layer Deposition of Functional Layers for on Chip 3 D Li-Ion All Solid State Microbattery" Adv. Energy Mater. 2016, 201601402, 1601402.
Cheah et al. "Self-supported three-dimensional nanoelectrodes for microbattery applications" Nano Lett. 2009, 9, 3230-3.
International Search Report and Written Opinion for International Application No. PCT/EP2017/066417 dated Oct. 17, 2017 in 17 pages.

* cited by examiner

ION INSERTION BATTERY ELECTRODE AND METHOD OF FABRICATING SAME

CROSS-REFERENCE TO RELATED APPLICATIONS

This application is a continuation of PCT Application No. PCT/EP2017/066417, filed Jul. 3, 2017 which claims foreign priority to European Patent Application EP 16177826.1, filed Jul. 4, 2016. The content of each is incorporated by reference herein in its entirety.

BACKGROUND

Field

The disclosed technology generally relates to ion insertion type batteries and to methods for fabricating ion insertion type batteries, and more particularly to electrodes and electrode layers for ion insertion type batteries and to methods for forming the electrodes and electrode layers.

Description of the Related Technology

A material that is receiving considerable attention as an electrode for ion insertion type batteries such as lithium-ion batteries is $TiO_x$, since it offers a high theoretical capacity (e.g., 335 mAh/g or for anatase $TiO_2$ about 1280 mAh/cm$^3$) and offers a potentially cheap, environmentally friendly and stable alternative to the other electrode materials. However, due to its relatively low electronic conductivity and poor Li-ion conductivity it has a relatively poor rate performance, which makes it unsuitable for some applications.

To improve the rate performance, methods such as doping, nanostructuring or nanosizing and the use of different $TiO_x$ polymorphs are being investigated. Doping of the $TiO_x$ material may lead to an improved electronic conductivity of the material and in addition the ion conduction (ion diffusion) may be facilitated. Such positive conductivity effects have been reported for Li-ion diffusion in anatase and spinel $TiO_x$ based particles doped with cations and anions. Also, a reductive type of doping by $H_2$ has been proposed, giving rise to an enhanced electronic conductivity of anatase $TiO_x$ and improved Li-ion storage kinetics, e.g., a higher rate of Li-ion insertion and extraction, with more capacity available at higher charging rates. Such hydrogen doping process is typically done at a temperature above 300° C., such as for example at 450° C., which makes it incompatible with amorphous $TiO_x$. Among the different strategies to improve the rate performance of $TiO_x$, the use of amorphous $TiO_x$ instead of crystalline (e.g., anatase) $TiO_x$ shows promising results. However, also in this case nanostructuring or the creation of composites such as $TiO_x$/carbon composites is necessary to achieve a good rate performance.

Nanosizing leads to a reduction of the diffusion path for ions and electrons, such that the storage capacity may be enhanced. There are several reports showing an improved storage capacity based on nanosizing strategies for amorphous $TiO_x$, such as for example the introduction of (meso) porosity in the amorphous $TiO_x$ layers and the creation of nanotubes. For example, nanosizing of amorphous $TiO_x$ may comprise forming nanotubes by anodization of titanium sheets.

The creation of nanocomposites based on amorphous $TiO_x$, such as for example an amorphous $TiO_x$/carbon nanocomposite (e.g., carbon-titania/titanate nanocomposite), may lead to improved ion insertion and extraction properties. For example, an amorphous $TiO_x$ thin film may be deposited, such as for example by ALD (atomic layer deposition), on carbon nanosheets. Although a high capacity per weight of $TiO_x$ can be achieved using this approach, the volumetric capacity can be rather low.

In general, nanosystems comprising for example nanoparticles, nanotubes or nanosheets, tend to be significantly more expensive than thin-film based systems. Further, in the context of ion insertion type batteries such as Li-ion batteries, due to an enhanced surface area per volume in nanostructures, parasitic capacity losses may increase as a result of degradation of the electrolyte at the electrode interface. This is a major drawback of using nanoscaled structures for battery applications. Aarik et al. (thin solid films, vol. 305, no 1-2, 1 august 1997, p. 270-273) discloses thin films of titanium oxide comprising chlorine grown by ALD. Their optical properties are investigated and they are not used to form electrodes.

US 2011/052994 discloses a negative electrode for lithium-ion batteries comprising a film of titanium oxide comprising chlorine. This film is crystalline.

US 2015/086809 discloses a lithium-ion solid state battery deposited on a semiconductor substrate, in which a thin layer of pure titania is used in a negative electrode.

Chunmei Ban et al. (nanotechnology, vol. 24, no 42, 25 Sep. 2013, p. 424002) discloses a method for fabricating $TiO_2$ layers for the negative electrode of lithium batteries via ALD.

SUMMARY OF CERTAIN INVENTIVE ASPECTS

In one aspect, the disclosed technology provides electrode layer materials and electrode layers, such as for example thin-film electrode layers or (nano)particle based electrode layers, of ion insertion type batteries wherein the electrode layers offer a good rate performance and a high storage capacity.

In one aspect, the disclosed technology provides electrode layers of ion insertion type batteries wherein the electrode layers offer a charging rate higher than 1 C, and a capacity of at least 70% of the theoretical maximum capacity.

In one aspect, the disclosed technology provides electrode layer materials and electrode layers, such as for example thin-film electrode layers or (nano)particle based electrode layers, of ion insertion type batteries, wherein the electrode layer material has a good electronic conductivity and a good ion conductivity.

In one aspect, the disclosed technology provides electrode layer materials and electrode layers of ion insertion type batteries, wherein the electrode layer material has an electronic conductivity above $10^{-7}$ S/cm in the discharged state and an ion diffusivity above $10^{-14}$ cm$^2$/s in the discharged state.

In one aspect, the disclosed technology provides methods for forming electrode layers for ion insertion type batteries wherein the electrode layer material offers a good rate performance and a high volumetric storage capacity.

Electrode layers according to embodiments of the disclosed technology may be integrated in ion insertion type batteries, for example Li-ion, K-ion, Na-ion, Mg-ion or Al-ion batteries disclosed technology. Although the disclosed technology is mainly described with reference to a limited number of examples, as is readily appreciated by a person skilled in the art, other examples than the ones disclosed above are equally possible within the scope of the disclosed technology.

The above objective is accomplished by a method and device according to the disclosed technology.

In one aspect, the disclosed technology is related to a negative electrode of an ion insertion battery cell comprising a negative electrode layer comprising a titanium oxide comprising chlorine being either amorphous or a mixture of an amorphous titanium oxide comprising chlorine and a crystalline titanium oxide comprising chlorine, preferably with a ratio chlorine to titanium from 0.01 to 0.1, more preferably from 0.06 to 0.09, yet more preferably from 0.060 to 0.090 when measured by Rutherford Backscatter Spectroscopy. When a titanium oxide comprising chlorine is related to in the disclosed technology, this may refer to a material of general formula $TiO_xCl_y$ and preferably $TiO_{2-y}Cl_y$. In embodiments, y may be from 0.01 to 0.1, preferably from 0.06 to 0.09. In embodiments, the titanium oxide layer comprising chlorine may have for general formula $TiO_{2-y}Cl_y$, wherein y is from 0.01 to 0.1, preferably from 0.06 to 0.09. The thickness of an electrode layer according to embodiments of the disclosed technology may for example be in the range between 5 nm and 2 micrometer, such as for example in the range between 100 nm and 1 micrometer.

Preferably, the negative electrode layer may be an amorphous electrode layer, wherein the titanium oxide comprising chlorine is in an amorphous state. In other embodiments of the disclosed technology the negative electrode layer may comprise a mixture of amorphous titanium oxide comprising chlorine and crystalline titanium oxide comprising chlorine.

In embodiments of the disclosed technology, the negative electrode layer may be a thin-film electrode layer.

In embodiments of the disclosed technology, the negative electrode layer may be a (nano)particle-based electrode layer.

A negative electrode layer according to embodiments of the disclosed technology may have the function of an anode in the ion insertion type battery cell.

In another aspect, the disclosed technology relates to an insertion battery cell comprising a negative electrode in accordance with the first aspect.

In another aspect, the disclosed technology relates to an ion insertion type battery comprising at least one ion insertion battery cell in accordance with the second aspect.

In another aspect, the disclosed technology relates to a method for forming a negative electrode of a thin-film ion insertion battery cell in accordance with the first aspect, wherein the method comprises depositing a thin film of titanium oxide comprising chloride on a substrate by performing an atomic layer deposition process wherein the deposition temperature is in the range between 50° C. and 150° C., wherein $TiCl_4$ and $H_2O$ are used as precursors, and wherein the titanium oxide comprising chlorine is either amorphous or a mixture of an amorphous titanium oxide comprising chlorine and a crystalline titanium oxide comprising chlorine.

Depositing the thin film may comprise depositing the thin film on a planar substrate or on a non-planar substrate such as a three-dimensional (3D) substrate. A 3D substrate is a structured substrate comprising 3D features, such as for example a plurality of high aspect-ratio micro-pillars, high aspect-ratio micro-trenches, a plurality of nanowires, meshes, (nano)porous structures and/or three-dimensional scaffolds. The 3D features may be present in a regular pattern, such as e.g., a regular array, or they may be distributed randomly over the substrate.

In another aspect, the disclosed technology relates to a method for fabricating an ion insertion battery cell wherein the method comprises forming a negative electrode layer according to the fourth aspect.

The method for fabricating an ion insertion battery cell according to embodiments of the disclosed technology may comprise depositing the negative electrode layer on a layer stack comprising a first positive electrode layer and an electrolyte layer.

In another aspect, the disclosed technology relates to a method for fabricating an ion insertion battery comprising at least one ion insertion battery cell, the method comprising fabricating the at least one ion insertion battery cell by a method in accordance with other aspects of the disclosed technology.

In another aspect, the disclosed technology relates to a negative electrode obtainable by depositing a thin film of titanium oxide comprising chlorine on a substrate by performing an atomic layer deposition process using $TiCl_4$ and $H_2O$ precursors at a deposition temperature in the range between 50° C. and 150° C., the titanium oxide comprising chlorine being either amorphous or a mixture of an amorphous titanium oxide comprising chlorine and a crystalline titanium oxide comprising chlorine. Such a titanium oxide comprising chlorine is typically an electrically and ionically conductive material.

In another aspect, the disclosed technology relates to the use of a layer of titanium oxide comprising chlorine in an ion insertion electrode, wherein the titanium oxide comprising chlorine is either amorphous or a mixture of an amorphous titanium oxide comprising chlorine and a crystalline titanium oxide comprising chlorine. The ion insertion electrode may for instance be an electrode of e.g., an ion insertion type battery cell or an ion insertion type battery.

It is an advantage of an electrode layer according to embodiments of the disclosed technology that it allows obtaining a high storage capacity without the need for nanostructuring or nanosizing and/or without the need for forming carbon nanocomposites. However, electrode layers according to embodiments of the disclosed technology may be combined with nanostructuring approaches.

It is an advantage of methods according to embodiments of the disclosed technology that they enable forming smooth electrode layers having a well-controlled thickness and a well-controlled Cl content.

It is an advantage of methods according to embodiments of the disclosed technology that they allow forming thin-film electrode layers with good conformality, e.g., layers having a uniform thickness and exactly following the topography of the underlying substrate. Therefore, a method of the disclosed technology may advantageously be used for forming such layers on 3D structures (e.g., in a process for fabricating 3D battery architectures), such as for example on a structure comprising a plurality of high aspect-ratio micro-pillars, high aspect-ratio micro-trenches, a plurality of nanowires, meshes, (nano)porous structures and/or three-dimensional scaffolds. Due to the conformal deposition of the layers using an ALD based method according to embodiments of the disclosed technology, the thickness of the layers is substantially the same on the 3D structures and in the recesses between such structures as well as on the sides of such structures.

It is an advantage of methods according to embodiments of the disclosed technology that they can be easily up-scaled. In advantageous embodiments of the disclosed technology, spatial ALD may be used for forming the electrode layers. It is an advantage of spatial ALD as compared to temporal ALD that it allows faster deposition, e.g., a factor of 10 faster deposition, of the electrode layers. This results in a higher fabrication throughput and potentially a lower cost. This allows potentially for roll-to-roll fabrication.

It is an advantage of methods according to embodiments of the disclosed technology that a low deposition temperature is used, such as for example a deposition temperature in the range between 50° C. and 150° C. It is an advantage of such low temperatures that the deposition of an electrode layer according to embodiments of the disclosed technology is compatible with some solid-state electrolytes that are only functional in the glassy state, such as for example LiPON or $Li_2S$—$P_2S_5$. The low deposition temperature used allows the prevention the crystallization of such materials, which is important for achieving the highest possible performance. In addition, it is an advantage of such low deposition temperature that it may mitigate oxidation of current collectors, or chemical (or structural) modification of other materials used in a battery stack.

It is an advantage of methods according to embodiments of the disclosed technology that the as-deposited electrode layers are amorphous electrode layers, which may give rise to an enhanced storage capacity as compared to crystalline electrode layers. The electrode layers according to embodiments of the disclosed technology may be used in an amorphous state in the battery. However, if desired, they may be transformed into a crystalline state, for example by performing an annealing step at a relatively low temperature, such as for example at about 300° C., the disclosed technology not being limited thereto.

Particular and preferred aspects of the disclosed technology are set out in the accompanying independent and dependent claims. Features from the dependent claims may be combined with features of the independent claims and with features of other dependent claims as appropriate and not merely as explicitly set out in the claims.

The above and other characteristics, features and advantages of the disclosed technology will become apparent from the following detailed description, taken in conjunction with the accompanying drawings, which illustrate, by way of example, the principles of the disclosed technology. This description is given for the sake of example only, without limiting the scope of the disclosed technology. The reference figures quoted below refer to the attached drawings.

BRIEF DESCRIPTION OF THE DRAWINGS

FIG. 13A shows pillars (top view). Pillars coated according to embodiments of the disclosed technology are also shown (FIG. 13B shows tilted top view and FIG. 13C shows cross-section view).

Figure 1:
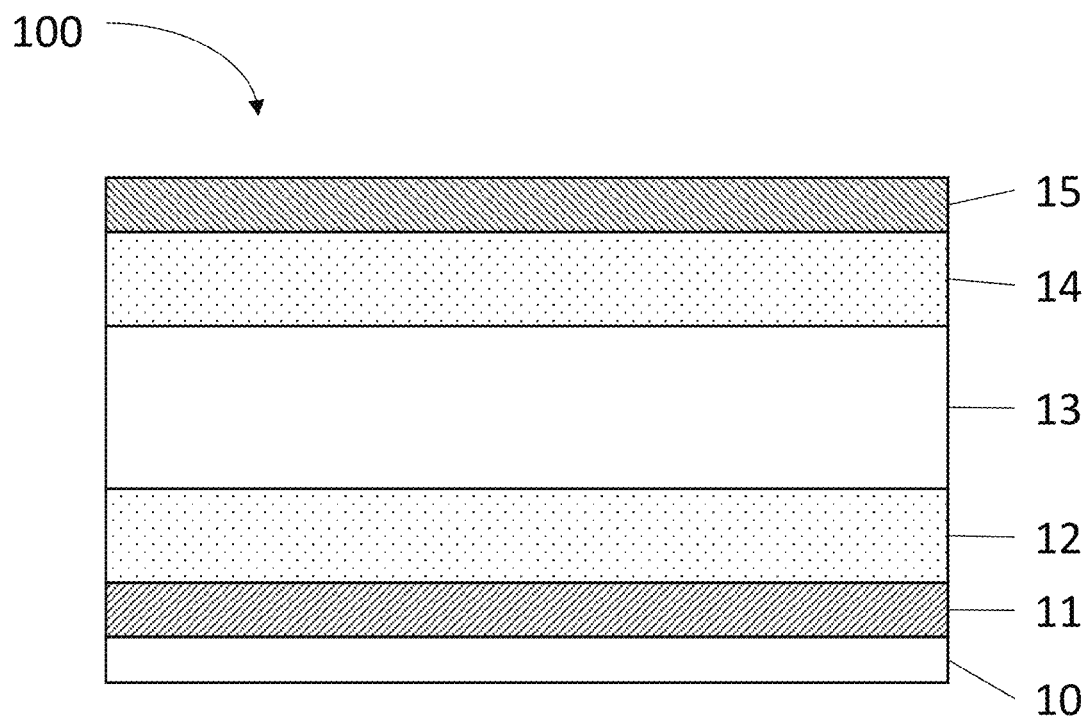
FIG. 1 shows a schematic cross section of a battery cell.

In the different figures, the same reference signs refer to the same or analogous elements.

DETAILED DESCRIPTION OF CERTAIN ILLUSTRATIVE EMBODIMENTS

The disclosed technology will be described with respect to particular embodiments and with reference to certain drawings but the disclosed technology is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the disclosed technology.

The terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosed technology described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the disclosed technology described herein are capable of operation in other orientations than described or illustrated herein.

It is to be noticed that the term "comprising," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the disclosed technology, the only relevant components of the device are A and B.

Reference throughout this specification to "one embodiment" or "an embodiment" means that a particular feature, structure or characteristic described in connection with the embodiment is included in at least one embodiment of the disclosed technology. Thus, appearances of the phrases "in one embodiment" or "in an embodiment" in various places throughout this specification are not necessarily all referring to the same embodiment, although they may also refer to the same embodiment. Furthermore, the particular features, structures or characteristics may be combined in any suitable manner, as would be apparent to one of ordinary skill in the art from this disclosed technology, in one or more embodiments.

Similarly, it should be appreciated that in the description of exemplary embodiments of the disclosed technology, various features of the disclosed technology are sometimes grouped together in a single embodiment, figure, or description thereof for the purpose of streamlining the disclosed technology and aiding in the understanding of one or more of the various inventive aspects. This method of disclosed technology, however, is not to be interpreted as reflecting an intention that the claimed disclosed technology requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosed technology.

Furthermore, while some embodiments described herein include some but not other features included in other embodiments, combinations of features of different embodiments are meant to be within the scope of the disclosed technology, and form different embodiments, as would be understood by those in the art. For example, in the following claims, any of the claimed embodiments can be used in any combination.

In the description provided herein, numerous specific details are set forth. However, it is understood that embodiments of the disclosed technology may be practiced without these specific details. In other instances, well-known methods, structures and techniques have not been shown in detail in order not to obscure an understanding of this description.

The following terms are provided solely to aid in the understanding of the disclosed technology.

In the context of the disclosed technology, a battery cell is a structure comprising two electrode layers with an electrolyte layer in between, i.e. a structure comprising an first electrode layer/electrolyte layer/second electrode layer stack. A battery may comprise a single battery cell or it may comprise a plurality of, e.g., at least two, battery cells. A battery may comprise two or more battery cells connected in series or in parallel, or a combination of series and parallel connected battery cells.

In the context of the disclosed technology, an ion insertion type battery is a battery comprising electrodes that can accept or release cations or anions during operation of the battery. Ion insertion type batteries can rely on the insertion/extraction of only one cation element, multiple cation elements, only anions or a mixture of anion and cation elements. An ion insertion type battery further comprises an electrolyte that allows for ionic conduction of the respective ion used, while being (electro)chemically stable with regard to the used electrode material.

In a rechargeable battery, each of the electrodes has a first polarity during the discharge (i.e. battery operation) and a second, opposite polarity during charging. Technically speaking however, the negative electrode is the anode during the discharge and the cathode during charging. Vice versa, the positive electrode is the cathode during discharge and the anode when charging the battery. In the context of the disclosed technology, the terminology of the discharge (i.e. battery operation) is used. Hereinafter, anode connotes the negative electrode while cathode connotes the positive electrode. Through the disclosed technology, when "anode material" refers to the negative electrode material and "cathode material" refers to the positive electrode material.

As used herein, NC refers to a charge or discharge rate which is N times the rated current capacity C of a battery. N is a number; it can be a natural number or a fraction.

In the context of the disclosed technology, a thin film is a thin layer or thin coating having a thickness in the range between 10 nm and 10 micrometer. A thin-film battery is a battery composed of thin-film layers, i.e. a battery wherein the cathode layer, the electrolyte layer and the anode layer are thin layers with a thickness in the range between 10 nm and 10 micrometer.

In the context of the disclosed technology, nanoparticles are particles having a diameter in the range between 1 nm and 500 nm, typically between 10 nm and 100 nm. The nanoparticles can for example have a particular shape such as a spherical, cubic, octahedral or coned shaped, or they can have a random shape. A (nano)particle based electrode layer is an electrode layer containing (nano)particles, and optionally additives such as a binder and and/or an electron conductor such as e.g., carbon black.

The disclosed technology will now be described by a detailed description of several embodiments of the disclosed technology. It is clear that other embodiments of the disclosed technology can be configured according to the knowledge of persons skilled in the art without departing from the true spirit or technical teaching of the disclosed technology, the disclosed technology being limited only by the terms of the appended claims.

Although the disclosed technology is mainly describes thin-film solid-state Li-ion batteries, the disclosed technology is not limited thereto. For example, electrode layers and methods according to embodiments of the disclosed technology may also be used in the context of particle based batteries and/or in the context of liquid electrolyte batteries. Further, electrode layers and methods according to embodiments of the disclosed technology may also be used in other ion insertion type batteries, such as for example Mg-ion, K-ion, Na-ion or Al-ion batteries. The electrode layers may also be used as electrodes in thin-film batteries, in particle based batteries, in all-solid-state batteries, or in liquid electrolyte batteries.

FIG. 1 shows a schematic cross section of a thin-film battery cell 100. It comprises a stack of a first current collector layer 11, a first electrode layer 12, an electrolyte layer 13, a second electrode layer 14 and a second current collector layer 15. This stack may be provided on a substrate 10. The first electrode layer 12 may be a negative electrode layer or anode layer and the second electrode layer 14 may be a positive electrode layer or cathode layer or vice versa, the first electrode layer 12 may be a positive electrode layer or cathode layer and the second electrode layer 14 may be a negative electrode layer or anode layer.

In some embodiments, it is assumed that the first electrode layer 12 is a positive electrode layer and the first current collector layer 11 is a positive current collector layer and it is assumed that the second electrode layer 14 is a negative electrode layer and the second current collector layer 15 is a negative collector layer.

An electrode layer according to embodiments of the disclosed technology may advantageously be used as the second (negative) electrode layer 14 in the structure shown in FIG. 1, i.e. it may advantageously be deposited after having deposited a first (positive) current collector layer 11, a first (positive) electrode layer 12 and an electrolyte layer 13 on the substrate 10. As further described, an electrode layer according to embodiments of the disclosed technology may advantageously be an amorphous layer. By depositing the electrode layer according to embodiments of the disclosed technology after having deposited the other layers of the layer stack, the risk of crystallization of the amorphous electrode layer, e.g., crystallization to the anatase phase, may be avoided. If the amorphous electrode layer would be deposited first, there might be a risk that such crystallization would occur as a result of the deposition of the other layers of the stack, which may require annealing. Crystallization of the amorphous electrode layer would result in a loss of capacity and is therefore preferably avoided. It is an advantage of embodiments of the disclosed technology that the electrode layer is deposited at low temperatures, such that in embodiments wherein an amorphous (glassy) solid electrolyte layer is used and deposited before providing the electrode layer, the low deposition temperature of the electrode layer in accordance with embodiments of the disclosed technology allows to preserve a high rate performance.

The substrate 10 may for example comprise a semiconductor material such a group IV semiconductor material, e.g., silicon, a metal (e.g metal foil), a carbon nanosheet, a plastic foil or a ceramic material such as a silicate. In the example shown in FIG. 1, the substrate 10 is a planar substrate. However, the substrate 10 may also be a non-planar substrate, e.g., comprising a plurality of 3D features or 3D microstructures, such as for example a plurality of micro-pillars, a plurality of nanowires or a substrate comprising 3D (nano)meshes, nanotubes and/or other porous structures, such as for example porous anodized alumina. The 3D features may be present on the substrate in a regular pattern, such as for example a regular array pattern, or they may be randomly distributed over the substrate. For example, the substrate 10 may comprise an array of high aspect-ratio pillars, such as for example silicon pillars, on which the first collector layer 11 may be coated. The pillars may for example have a diameter in the range between 0.5 micrometer and 10 micrometer, a spacing of 1 micrometer to 20 micrometer and a height in the range between 10 micrometer and 200 micrometer, the disclosed technology not being limited thereto. It is an advantage of using a substrate comprising a plurality of 3D microstructures that it results in an increased battery capacity.

The first collector layer 11 may for example be a positive collector layer. The positive collector layer 12 is an electrically conductive layer, such as a metal layer (e.g., comprising Pt, Al, Cu, Ti, W or Au), a conductive polymer layer (e.g., polyaniline), a conductive ceramic layer (e.g., TiN) or a conductive oxide (e.g., $RuO_2$) or carbon layer, the disclosed technology not being limited thereto. In embodiments of the disclosed technology wherein the substrate 10 is an electrically conductive substrate, the substrate may also function as a first collector layer and there may be no need for providing a dedicated first collector layer 11.

The first electrode layer 12 may for example be a positive electrode layer or a cathode layer. For Li-ion batteries it may for example comprise $LiCoO_2$, $MnO_2$, $LiMn_2O_4$, $LiNiO_2$, $Li_x(Mn_yNi_{1-y})_{2-x}O_2$, $LiNi_{1-x}Co_xO_2$, $LiNi_xCo_yAl_zO_2$, $Li(Ni_{1/3}Mn_{1/3}Co_{1/3})O_2$, $LiFePO_4$, $Li_2FePO_4F$, $V_2O_5$, $V_2O_5$—$TeO_2$, $WO_3$—$V_2O_5$, $TiS_xO_y$, $MO_x$, $MS_x$ or Li—$V_2O$, the disclosed technology not being limited thereto. For other ion insertion type batteries, the first electrode layer 12 may for example comprise similar materials as listed above for Li-ion batteries, but with the Li being substituted by the other ion. For example, for Na-ion batteries the first electrode layer 12 may e.g., comprise $NaMn_2O_4$; for Mg-ion batteries the first electrode layer may e.g., comprise $MgMn_2O_4$; and for Al-ion batteries the first electrode layer may e.g., comprise $Al_xV_2O_3$, the disclosed technology not being limited thereto.

The electrolyte layer 13 may for example comprise a separator (e.g., a microporous separator) soaked in a liquid electrolyte, a gel-polymer electrolyte or a solid-state electrolyte. For embodiments with a liquid electrolyte, the separator can for example comprise a polyolefin material such as a polyethylene or a polypropylene. The liquid electrolyte may comprise a solvent such as for example an organic solvent (e.g., propylene carbonate, dimethyl carbonate) or water. For Li-ion batteries the mobile ions (Li ions) may for example be provided in the liquid electrolyte by dissolving for example lithium hexafluorophosphate or lithium perchlorate in the solvent. For other ion insertion batteries, the mobile ions may be provided by using salts soluble towards the specific solvent used. For example, for Mg-ion batteries $Mg(ClO_4)_2$ may be dissolved in propylene carbonate to form the liquid electrolyte. Polymer-gel electrolytes may comprise a polymer host such as for example poly(ethyleneoxide) or poly(propyleneoxide) with a plasticizer and a salt. Solid electrolytes are solid ion conductors and may in case of a Li-ion battery for example comprise an organic material such as, e.g., poly(ethyleneoxide)/$LiCF_3SO_3$, or an inorganic material such as a Lithium Super Ionic Conductor material (LISICON material, such as e.g., $Li_{14}ZnGe_4O_{16}$), a thio-LISICON material (such as, e.g., $Li_{10}GeP_2S_{12}$), a Sodium Super Ionic Conductor material (NASICON material, such as, e.g., $Li_{1.3}Al_{0.3}Ti_{1.7}(PO_4)_3$), a perovskite material (such as, e.g., $La_{0.5}Li_{0.5}TiO_3$), a garnet material (such as, e.g., $Li_7La_3Zr_2O_{12}$) or an amorphous material (such as, e.g., LiPON, $Li_{2.88}PO^{3.73}N0.14$), the disclosed technology not being limited thereto.

The second electrode layer 14 may for example be a negative electrode layer or anode layer. As further described, in embodiments of the disclosed technology this negative electrode layer or anode layer is a titanium oxide layer comprising chlorine, e.g., an amorphous titanium oxide layer comprising chlorine.

The second collector layer 15 may for example be a negative collector layer. The negative collector layer 15 is an electrically conductive layer, such as a metal layer (e.g., Cu, Ni, Al), an organic conductor layer (e.g., polypyrrole), a conductive ceramic layer (e.g., TiN, ITO) or a (nano)carbon (e.g., amorphous carbon, carbon nanosheet), the disclosed technology not being limited thereto.

The disclosed technology is related to ion insertion battery cells and ion insertion batteries, such as for example thin-film Li-ion batteries and battery cells (the disclosed technology not being limited thereto), comprising a negative electrode layer that offers a good rate performance, such as a charging rate higher than 1 C, and a capacity of at least 70% of the theoretical maximum capacity, even without nanostructuring or carbon composite formation. In embodiments of the disclosed technology the electrode material of the negative electrode layer 14 comprises, preferably consists of a titanium oxide comprising chlorine being either amorphous or a mixture of an amorphous titanium oxide comprising chlorine and a crystalline titanium oxide comprising chlorine. Preferably, the electrode material of the negative electrode layer 14 comprises, preferably consists of an amorphous titanium oxide. The ratio chlorine to titanium in the negative electrode layer 14 is preferably from 0.01 to 0.1, more preferably from 0.06 to 0.09, when measured by Rutherford Backscatter Spectroscopy. The titanium oxide comprising chlorine may have for general formula $TiO_xCl_y$, with $1 \leq x < 2.0$ and $0.01 \leq y < 0.1$. The titanium oxide comprising chlorine may have for general formula $TiO_xCl_y$, with x being about 2 and $0.01 < y \leq 0.1$. Without being limited by theory, the titanium oxide comprising chlorine may have for general formula $TiO_{2-y}Cl_y$, wherein y is from 0.01 to 0.1, preferably from 0.06 to 0.09. The capacity measured in examples according to the disclosed technology is larger than the theoretical capacity calculated if the film would be able to accept 1 $Li^+$ per Ti by using the Ti(IV)-Ti(III) redox couple. This strongly suggests that more than one Li+ is inserted per $TiO_2$ unit formula by using the Ti(III) and Ti(II) redox state. The enhanced electronic conductivity observed in embodiments of the disclosed technology also suggests the permanent presence of Ti(III) states after substitution of $O^{2-}$ by $Cl^-$ in $TiO_2$. This strongly suggests a general formula for the titanium oxide comprising chlorine as follow: $(TiO_2)_{1-y}(TiOCl)_y$, which can be simplified as follow: $TiO_{2-y}Cl_y$. The thickness of the electrode layer may for example be in the range between 5 nm and 2 micrometer, for example between 5 nm and 1 micrometer, such as for example between 100 nm and 1 micrometer, the disclosed technology not being limited thereto. When using a negative electrode layer according to embodiments of the disclosed technology in a 3D battery structure, the thickness of the negative electrode layer may depend on, e.g., be limited by, the specific geometry of the 3D structure.

The disclosed technology also provides methods for forming such negative electrode layers 14. An electrode layer according to embodiments of the disclosed technology may be provided by means of an atomic layer deposition process, wherein the deposition temperature is lower than 150° C., such as for example between 50° C. and 130° C., and wherein $TiCl_4$ and $H_2O$ are used as precursors.

Experiments were performed wherein 100 nm thick amorphous layers comprising a titanium oxide comprising chlorine with varying amounts of Cl were deposited. These layers showed near theoretical $Li^+$-ion insertion capability at a rate of 0.2 C (corresponding to a complete charging in 5 hours) and a very good retention of the capacity upon increased charging speed. This gives rise to an excellent $Li^+$ rate performance while being stable over many cycles.

In the experiments, amorphous layers comprising a titanium oxide comprising chlorine were deposited by means of atomic layer deposition (ALD), using $TiCl_4$ and $H_2O$ as precursors, at a deposition temperature lower than 150° C. The precursors were dosed at a flow rate of 50 sccm for $TiCl_4$ and 500 sccm for $H_2O$. 100 nm thick thin-film electrode layers comprising a titanium oxide comprising chlorine were fabricated which showed superior performance in terms of capacity and rate performance. By lowering the deposition temperature, more chlorine can be incorporated, which in turn enhances the capacity and rate performance. Without being limited by theory, this mechanism may arise from an increase in the electronic conductivity and/or improved Li+ diffusion within the electrode layer.

In the experiments, amorphous thin-film electrode layers comprising a titanium oxide comprising chlorine were deposited by spatial atomic layer deposition (s-ALD) using $TiCl_4$ and $H_2O$ vapour as precursors. It is an advantage of spatial atomic layer deposition that it allows for faster deposition rates, such as for example 10 times faster deposition for a 100 nm thick layer, as compared to temporal atomic layer deposition. Such faster deposition rates potentially lower the fabrication cost. However, the disclosed technology is not limited thereto. In embodiments of the disclosed technology also temporal atomic layer deposition may be used for forming the amorphous thin-film electrode layers comprising a titanium oxide comprising chlorine, as well as other methods.

In an alternative approach for forming electrode layers according to embodiments of the disclosed technology, for example a sol-gel based synthesis method could be used, based on a known route for the fabrication of $TiO_2$ but modified to include a Cl containing compound (such as HCl). For example, using a sol-gel based synthesis, an organometallic precursor of titanium such as titanium(IV) isopropoxide or titanium(IV) butoxide may be mixed with an amount of hydrochloric acid (HCl) in solution. Such an approach would enable the fabrication of (nano)particles comprising a titanium oxide comprising chlorine, for example for use as an active material in a (nano)particle based electrode layer.

It is an advantage of using ALD for the deposition of a thin-film electrode layers in accordance with embodiments of the disclosed technology that it allows for the deposition of smooth films with well controlled properties, such as for example a well-controlled layer thickness and a well-controlled Cl content. This may for example be achieved by varying the deposition temperature, the $TiCl_4$ and/or $H_2O$ dosage and the exposure time. For example, the Cl content can be controlled/varied by varying the deposition temperature or by varying the exposure time to the $TiCl_4$ precursor. In experiments performed with a spatial ALD system, it was observed that more Cl was incorporated in the electrode layer when lowering the deposition temperature. It is an advantage of ALD deposition that the deposition temperature may be lower than 150° C., e.g., between 50° C. and 150° C. Such low deposition temperature allows preventing crystallization of the negative electrode layer. This may in addition result in smooth layers with a low surface roughness, such as ≤5 nm RMS roughness, e.g., ≤1 nm RMS roughness. Due to the self-limiting growth of ALD, it is a further advantage of using ALD that it allows for a conformal deposition, which is required for the development of 3D thin-film batteries. If desired, a post-deposition anneal may be performed to achieve a crystalline thin layer comprising a titanium oxide comprising chlorine, e.g., a single crystalline or a polycrystalline thin layer, or a layer comprising a mixture of a crystalline and amorphous states.

The spatial ALD concept is based on the spatial separation of the half-reactions instead of a temporal separation. A spatial ALD reactor has separate zones exposing the different precursors one by one to a substrate that moves underneath the reactor. Between and around the reaction zones, shields of inert gas separate the precursor flows. In the experiments described here, the layers comprising a titanium oxide comprising chlorine were deposited in a reactor wherein the separate reaction zone inlets are incorporated in a round reactor head mounted on top of a rotating table holding the substrate. The precursor inlets are incorporated in the round reactor head and surrounded by exhaust zones.

Amorphous thin-films comprising a titanium oxide comprising chlorine in accordance with embodiments of the disclosed technology were deposited on a TiN/Si substrate. The substrates were prepared by sputter deposition of a 70 nm thick TiN layer on 200 mm Si wafers. The wafers were diced in 2 cm×2 cm pieces, on which further ALD deposition and characterization was performed. For the spatial atomic layer deposition (s-ALD), four 2 cm×2 cm samples were mounted on a holder and loaded into the s-ALD reactor. Precursors for the deposition were $TiCl_4$ and $H_2O$, which were dosed at 50 sccm and at 500 sccm, respectively. Depositions at 20, 30 and 40 rpm substrate rotation speed were performed, which directly influenced the exposure time of the precursors to the substrate. The amount of rotation cycles was adjusted so that the resulting film thickness was 100 nm. Depending on the temperature, this was between 1155 to 1538 cycles. The temperature of the substrate was controlled during deposition and fixed at different temperatures between 50° C. and 130° C.

Figure 2:
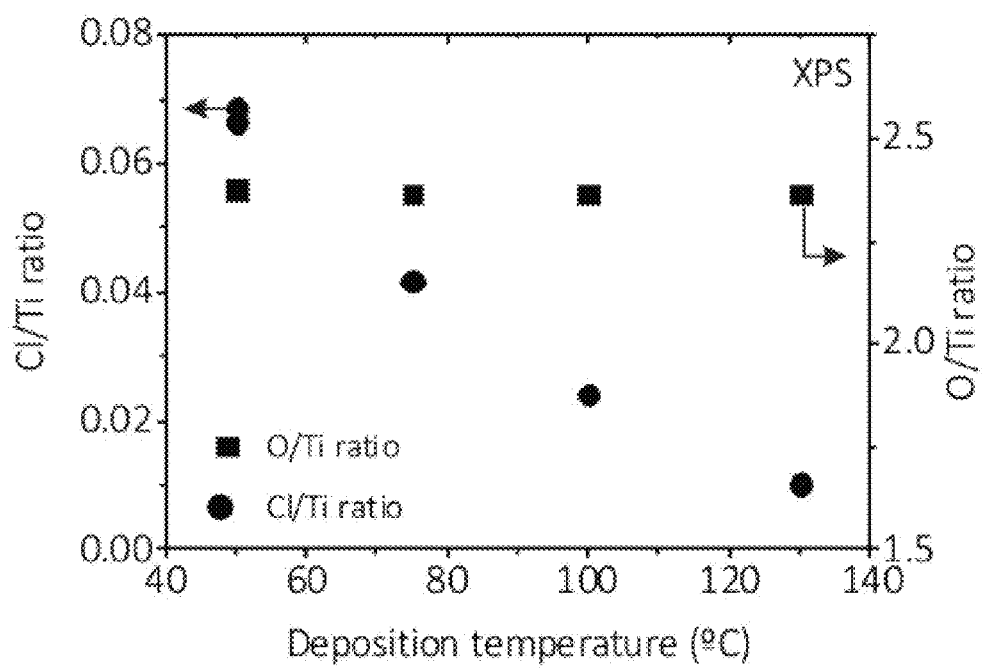
FIG. 2 shows X-ray photoelectron spectroscopy (XPS) measurement results illustrating the chlorine to titanium ratio (filled circles) and the oxygen to titanium ratio (filled squares) for thin ALD films of titanium oxide comprising chlorine in accordance with embodiments of the disclosed technology, as a function of the atomic layer deposition (ALD) deposition temperature.
Figure 3:
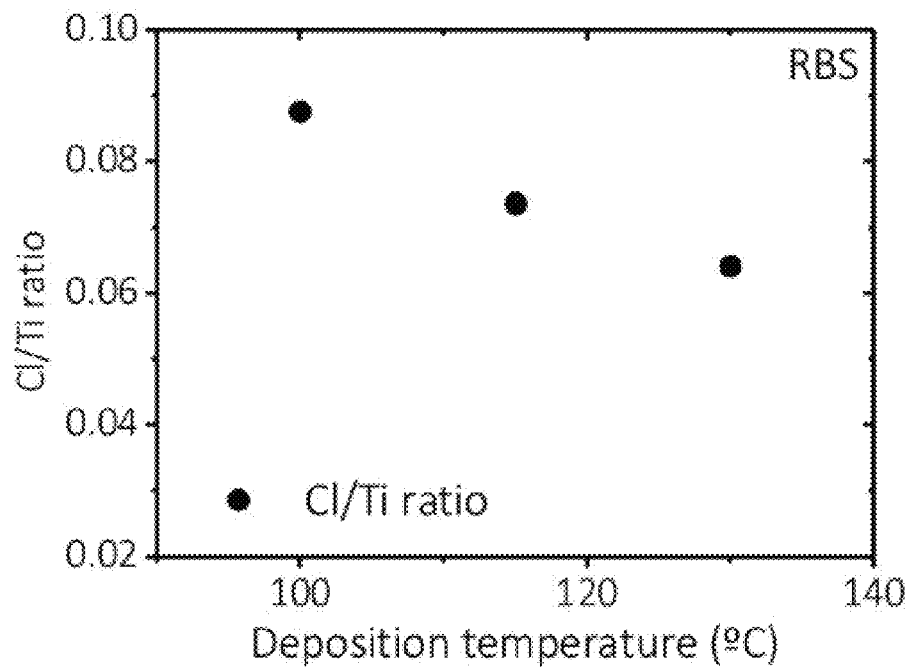
FIG. 3 shows Rutherford backscattering spectrometry (RBS) measurement results showing the Cl/Ti ratio for thin ALD films of titanium oxide comprising chlorine in accordance with embodiments of the disclosed technology, as a function of the ALD deposition temperature.

The stoichiometry of the films comprising a titanium oxide comprising chlorine was determined using X-ray Photoelectron Spectroscopy (XPS) and Rutherford Backscatter Spectroscopy (RBS). FIG. 2 shows XPS measurement results illustrating the chlorine to titanium ratio (filled circles) and the oxygen to titanium ratio (filled squares) for the thin ALD films comprising a titanium oxide comprising chlorine, as a function of the ALD deposition temperature. FIG. 3 shows RBS measurement results showing the Cl/Ti ratio for the thin ALD films of titanium oxide comprising chlorine, as a function of the ALD deposition temperature.

From the XPS measurements (as shown in FIG. 2), it can be concluded that the Cl/Ti ratio is between 0.01 and 0.07 for depositions performed at a deposition temperature between 50° C. and 130° C., and that the Cl/Ti ratio decreases with increasing deposition temperature. The O/Ti ratio is seen to be about 2.3 for the different deposition temperatures in this range, meaning that it is substantially independent on the deposition temperature. The O/Ti ratio obtained from the XPS measurements is higher than the expected ratio of about 2, because in these measurements no correction was done for taking into account the presence of OH-surface species.

From the RBS measurements (as shown in FIG. 3), a similar trend is measured for the Cl/Ti ratio, showing that a lower deposition temperature leads to a higher Cl/Ti ratio in the ALD deposited films of titanium oxide comprising chlorine. Using RBS, a Cl/Ti ratio in the range between 0.064 and 0.088 was measured for films of titanium oxide comprising chlorine deposited between 100° C. and 130° C. Without being limited by theory, the discrepancy between the XPS measurement results shown in FIG. 2 and the RBS measurement results shown in FIG. 3 may be related to XPS being a surface sensitive technique whereas RBS is a "bulk" technique. Therefore, the XPS results show the composition of the upper few nanometers of the layer of titanium oxide comprising chlorine whereas the RBS results show the bulk composition, reflecting the total Cl content. Also, for the RBS measurements there may have been some interference with the underlying TiN substrate which might lead to over- or underestimation of the Cl content. Furthermore, a small influence of the rotation speed (i.e. exposure time of the precursors) of the rotating table holding the substrate on the Cl/Ti ratio was observed, with a lower Cl/Ti ratio for lower rotation speeds. This effect is however less significant than the effect of the deposition temperature. Nevertheless, this means that, apart from or in addition to the deposition temperature, also the rotation speed may be used as a control mechanism for modifying the Cl content of a layer of titanium oxide comprising chlorine in embodiments of the disclosed technology.

From the RBS measurement results, also the absolute Ti content in the layers was derived. Using a layer thickness of 100 nm, the density of the material for all values of y was calculated to be about 2.8 g/cm$^3$. This is significantly lower than for example the density of anatase $TiO_2$ (3.8 g/cm$^3$).

For the electrochemical characterization of the thin-films of titanium oxide comprising chlorine, a custom-made three-electrode Teflon cell was used which can be clamped onto the substrate and filled with an electrolyte. The cell contains two compartments, one compartment comprising a Li metal foil as a counter electrode and the other compartment comprising a Li metal foil as a reference electrode. The compartment with the Li reference electrode was connected to the main compartment through a lugging capillary close to the surface of the working electrode. All experiments were performed at room temperature (21° C.) using 1M $LiClO_4$ in propylene carbonate (PC) as an electrolyte. Measurements were done in an Ar filled glove box with 1 ppm $O_2$ and 0 ppm $H_2O$. Contact was made to the substrate by scratching the back of the sample and applying a GaIn paste and contacting with Cu foil. The electrochemical cell was controlled through a PGSTAT101 Autolab (Metrohm) using the Nova 1.10 software.

Cyclic voltammetry was performed for 5 cycles between 0.1V and 3.2V at 10 mVs$^{-1}$. Subsequently, galvanostatic charge/discharge experiments were carried out with current densities ranging from 2.6 to 530 µA/cm$^2$ with cut-off voltages of 3.0 and 0.1V to characterize the Li$^+$-ion storage capacity. All voltages are given versus Li$^+$/Li.

In the ideal case, the film of titanium oxide comprising chlorine would be able to accept 1 Li$^+$-ion per Ti (by using the Ti(IV)-Ti(III) redox couple), which would lead to a maximum theoretical capacity of 1280 mAh/cm$^3$ assuming a density corresponding to the anatase $TiO_2$ density.

Figure 4:
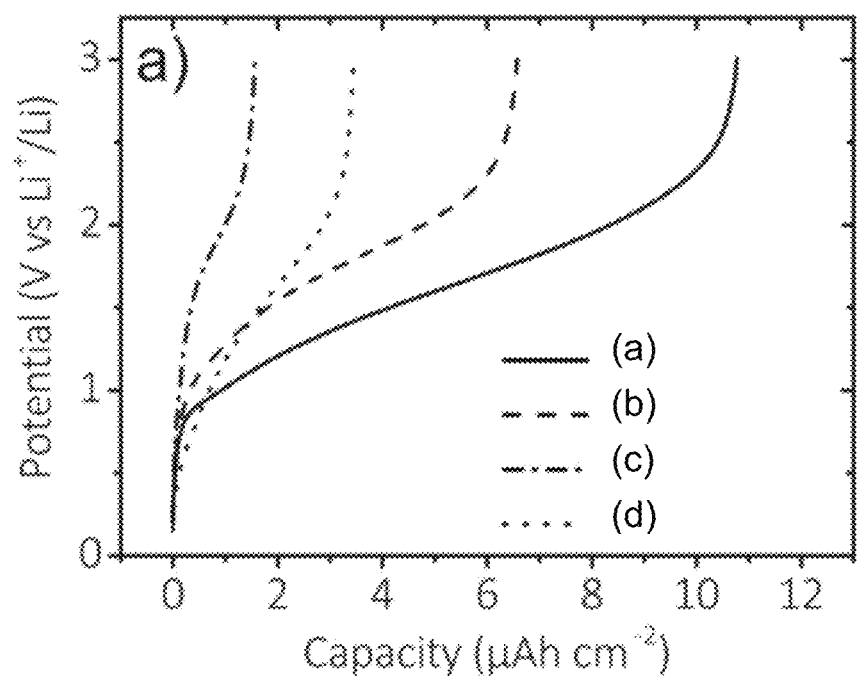
FIG. 4 shows the potential-capacity curves as determined from charge/discharge measurements for 100 nm thick thin films of titanium oxide comprising chlorine at a C-rate of 0.4 C in accordance with embodiments of the disclosed technology for different Cl contents (y=0.06; y=0.07 and y=0.09), and for a 35 nm thick amorphous $TiO_2$ layer at a C-rate of 1 C.

FIG. 4 shows the potential-capacity curves as determined from charge/discharge measurements at a rate of 0.4 C (5.3 µA/cm$^3$) for 100 nm thick thin films of titanium oxide comprising chlorine in accordance with embodiments of the disclosed technology for different Cl contents (curve a: y=0.06; curve b: y=0.07 and curve c: y=0.09). The Cl content (y-value) was determined from RBS measurements. In addition, the potential-capacity curve measured for a 35 nm thick amorphous TiO$_x$ layer (without Cl incorporation) is shown as a reference (curve d). For all layers a sloped potential profile is obtained, which is typical for amorphous $TiO_2$. The largest capacity is reached with the highest Cl content (in this case of titanium oxide comprising chlorine with a ratio Cl/Ti as measured by RBS of 0.09). The 100 nm film of titanium oxide comprising chlorine with a ration Cl/Ti as measured by RBS of 0.06 has the lowest capacity.

In an ideal system, the total capacity of a thin-film electrode (capacity expressed in mAh/cm$^2$) depends linearly on the film thickness (layer thickness). The thicker the electrode layer, the more capacity per area is available as there is more active material per area. Therefore, it would be expected that when increasing the amorphous TiO$_2$ film thickness from 35 nm to 100 nm, there would be a linear increase in capacity (or otherwise stated, it would be expected that the volumetric capacity remains constant). When comparing the capacity (in mAh/cm$^2$) between the prior art 35 nm amorphous TiO$_2$ layer and a 100 nm thick titanium oxide comprising chlorine with a ratio Cl/Ti as measured by RBS of 0.06 in accordance with an embodiment of the disclosed technology as shown in FIG. 4, it is observed that there is a decrease in areal capacity, contrary to what may be expected. This may be explained by a secondary effect of increased film thickness, namely an increase in electronic and ionic resistance, as the distance of charge transport within the layer increases. These increased resistances may effectively limit the available capacity at a certain charging rate. A way to circumvent this problem would be to limit the charging rate, which would in turn mean that it would take much longer to charge/discharge the electrode. Based on the results shown in FIG. 4, in the case of the 100 nm electrode layer of titanium oxide comprising chlorine with a ratio Cl/Ti as measured by RBS of 0.06 from the experiments, the resistive losses result in an aerial capacity that is less than for a prior art 35 nm amorphous TiO$_2$ electrode layer at equal charging rates. This shows that, in this specific case, simply increasing the film thickness limits the rate performance of the films, which in turn decreases the available capacity. However, the experimental results also show that according to this example, when an electrode layer according to embodiments of the disclosed technology has a higher Cl content (e.g., an electrode layer of titanium oxide comprising chlorine with a ratio Cl/Ti as measured by RBS of 0.09), a higher capacity of about 12 µh/cm$^2$ (or about 1200 mAh/cm$^3$) is achieved for a 100 nm thick electrode layer. It may be expected that due to the excellent rate performance of the layer of titanium oxide comprising chlorine with a ratio Cl/Ti as measured by RBS of 0.09, increasing the thickness of such a layer above 100 nm may further increase the capacity (above 12 µAh/cm$^2$), while maintaining the charging capabilities above 1 C.

Figure 5:
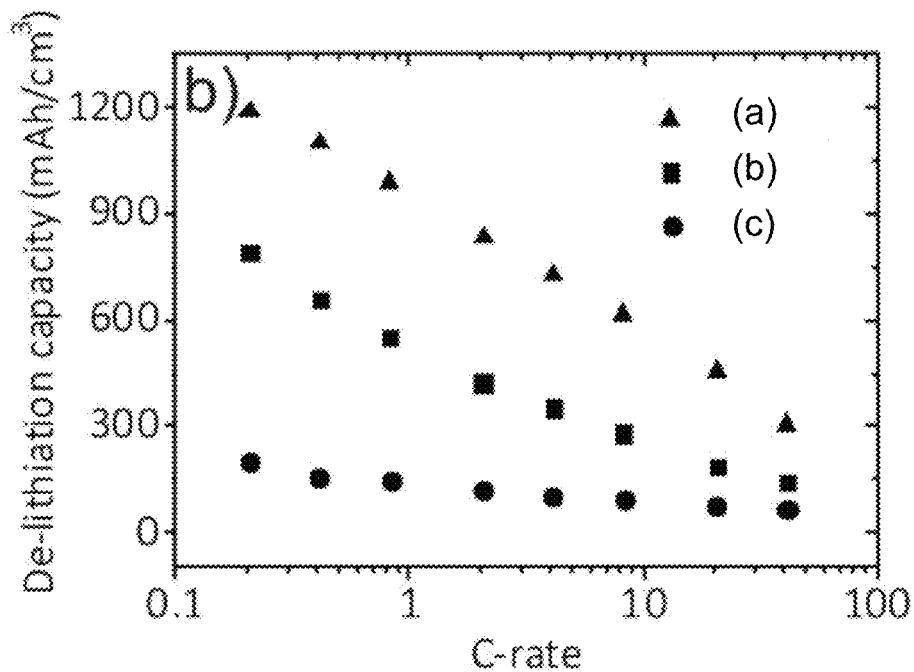
FIG. 5 shows the delithiation capacity as a function of C-rate as determined from charge/discharge measurements for 100 nm thick thin films of titanium oxide comprising chlorine in accordance with embodiments of the disclosed technology for different Cl contents (y=0.06; y=0.07 and y=0.09).

FIG. 5 shows the volumetric capacity as a function of C-rate as determined from charge/discharge measurements for 100 nm thick thin films of titanium oxide comprising chlorine in accordance with embodiments of the disclosed technology for different Cl contents (curve a: y=0.06; curve b: y=0.07 and curve c: y=0.09). The rate performance was probed by varying the applied current density during charge and discharge (where 1 C=~12.8 µA/cm$^2$ or 1280 mA/cm$^3$). The results of FIG. 5 show at the lowest measured C-rate (0.5 C), a volumetric capacity of 1189, 791 and 204 mAh/cm$^3$ for titanium oxide comprising chlorine with a ratio Cl/Ti as measured by RBS of 0.09, 0.07 and 0.06, respectively. The theoretical capacity for a 100 nm thick TiO$_2$ layer is 1280 mAh/cm$^3$ (assuming the anatase density), which shows that the layers of titanium oxide comprising chlorine with a ratio Cl/Ti as measured by RBS of 0.09 according to embodiments of the disclosed technology may achieve about 94% of this theoretical volumetric capacity at 0.5 C. At 20 C for example, the film of titanium oxide comprising chlorine with a ratio Cl/Ti as measured by RBS of 0.09 retains 50% of the 0.5 C capacity, which is extremely high for active materials which are in this thickness regime (i.e. 100 nm). For the calculation of the theoretical capacity the density for anatase titanium oxide (3.82 g/cm$^3$) was used, which could lead to an overestimation of the theoretical capacity, considering that it was shown by RBS that the amorphous layers according to embodiments of the disclosed technology are likely less dense. Using the density as measured by RBS in the calculations (2.8 g/cm$^3$), the theoretical capacity would be 940 mAh/cm$^3$. This is lower than the value measured for titanium oxide comprising chlorine with a ratio Cl/Ti as measured by RBS of 0.09 (1189 mAh/cm$^3$), suggesting either an insertion of more than 1 Li$^+$ per TiO$_2$ unit formula (by using the Ti(III) and Ti(II) redox state), and/or giving an indication that the density calculated from RBS is underestimated.

Figure 6:
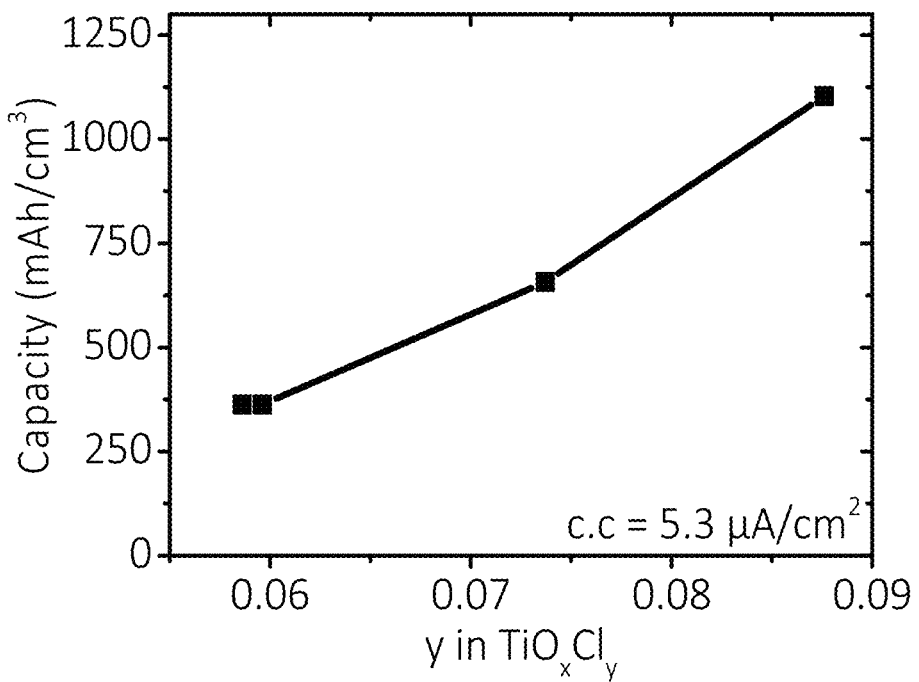
FIG. 6 shows the volumetric delithiation capacity measured at a rate of 0.4 (5.3 $\mu A/cm^2$) as a function of the Cl content y for 100 nm thick layers of titanium oxide comprising chlorine formed in accordance with embodiments of the disclosed technology.

FIG. 6 shows the volumetric delithiation capacity measured at a current density of 5.3 µA/cm$^2$ (0.4 C) as a function of the Cl content y for 100 nm thick layers of titanium oxide comprising chlorine formed in accordance with embodiments of the disclosed technology. The highest Cl content for which these electrochemical properties were measured was a Cl content y=0.09. This layer was deposited by means of spatial ALD at a deposition temperature of 100° C. Layers with even higher Cl contents may be deposited by further lowering the ALD deposition temperature.

Further experiments were performed wherein electrode layers of titanium oxide comprising chlorine in accordance with embodiments of the disclosed technology were deposited on a substrate comprising 3D structures, more in particular on a substrate comprising silicon micro-pillars. The silicon micro-pillars were fabricated on 300 mm Si wafers by photolithography and deep reactive ion etching. The silicon micro-pillars were provided in a regular pattern (arranged in a square lattice) over an area of 1 cm×1 cm. The diameter of the 50 µm high micro-pillars was about 2 µm, with an inter-pillar spacing of 2 µm. A 21 nm thick TiN current collector layer was deposited on the micro-pillars by means of temporal ALD. Next electrode layers of titanium oxide comprising chlorine were deposited on the substrate comprising the silicon micro-pillars with TiN current collector, by means of spatial ALD, at different deposition temperatures (100° C., 115° C. and 130° C.). TiCl$_4$ and H$_2$O were used as precursors at a flow rate of 50 sccm for TiCl$_4$ and 500 sccm for H$_2$O.

Figure 7:
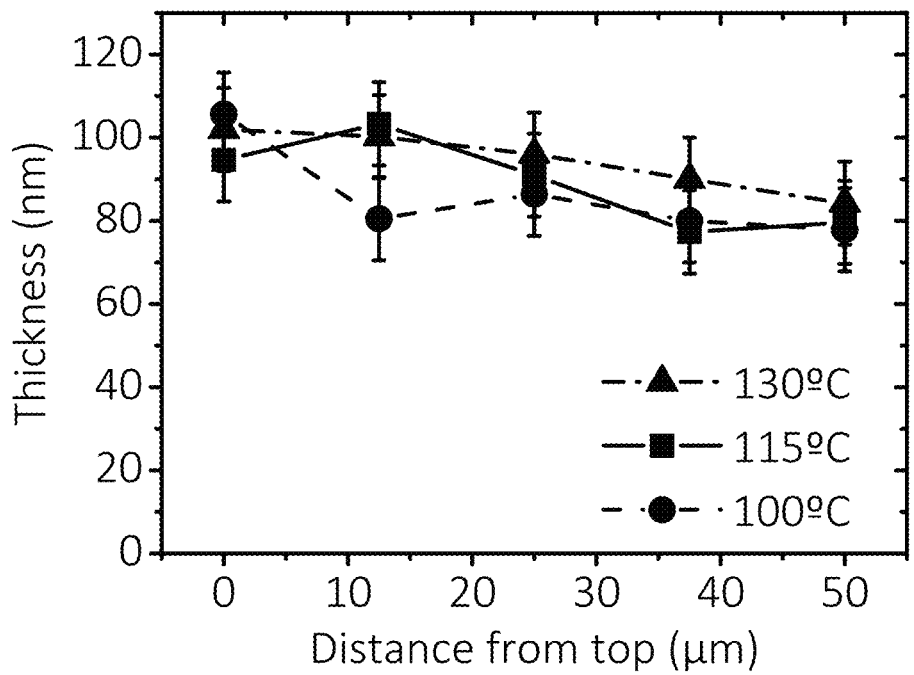
FIG. 7 shows the measured thickness of layers titanium oxide comprising chlorine deposited in accordance with a method of the disclosed technology on a 3D substrate comprising a plurality of micro-pillars, as a function of the distance from the top of the micro-pillars.

In order to characterize the conformality of the layers of titanium oxide comprising chlorine, the layer thickness on the walls at the edge of the micro-pillar array was measured as a function of depth (i.e. as a function of the distance from the top of the micro-pillars). For practical reasons, these measurements were done at an edge of the micro-pillar array, but the thickness of the layers of titanium oxide comprising chlorine with a ratio Cl/Ti as measured by RBS of 0.06 at the edge of the array is assumed to be representative for the thickness on the micro-pillars. The result of those thickness measurements is shown in FIG. 7. When comparing the top thickness (distance from top 0 µm) with the bottom thickness (distance from top 50 µm), it can be seen that there is at most a 20% drop in the thickness along the depth of the pillars. The process can be further optimized by increasing the exposure to the precursors, e.g., by decreasing the rotation speed of deposition.

Figure 8:
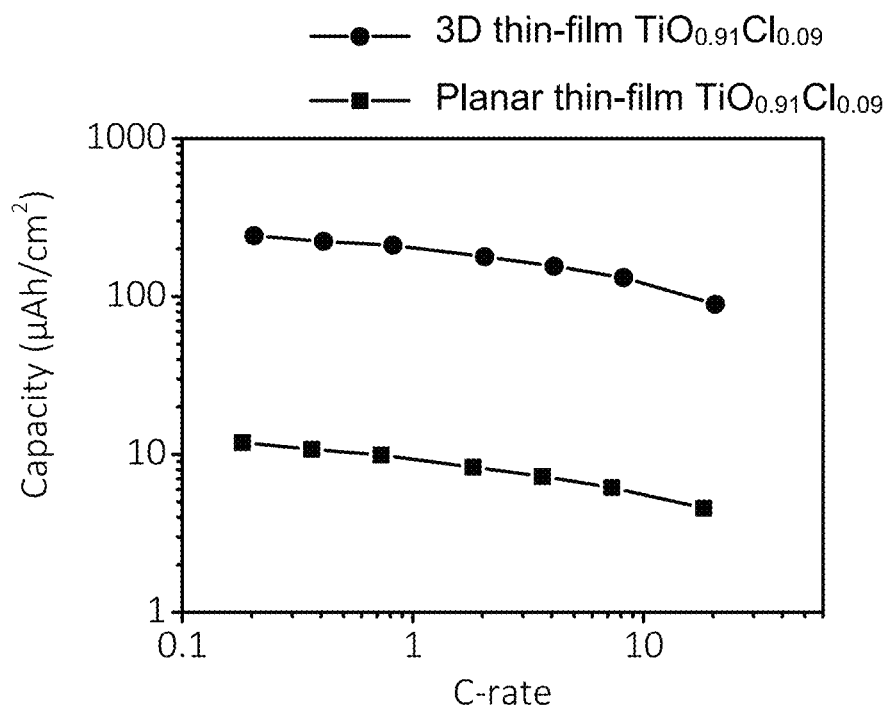
FIG. 8 shows the measured rate performance of planar (filled squares) and 3D (filled circles) thin film layers of titanium oxide comprising chlorine in a ratio Cl to Ti of 0.09 deposited in accordance with a method of the disclosed technology. The capacity per footprint area is given as a function of C-rate.

The thin-film electrode layers of titanium oxide comprising chlorine deposited at 100° C. on the 3D micro-pillar array structure were characterized electrochemically in terms of rate performance, and the results were compared to the rate performance of thin-film electrode layers of titanium oxide comprising chlorine of the same composition deposited on a planar substrate. FIG. 8 shows the measured rate performance of a 100 nm thick layer of titanium oxide comprising chlorine with a ratio Cl/Ti as measured by RBS of 0.09 deposited on a planar TiN-coated silicon substrate (filled squares) and the measured rate performance of a 100 nm thick titanium oxide comprising chlorine with a ratio Cl/Ti as measured by RBS of 0.09 deposited on the 3D silicon micro-pillar array as described above (filled circles). At the lowest applied C-rate (0.2 C), a capacity of 11.9 µAh/cm$^2$ was measured for the electrode layer deposited on the planar substrate, and a capacity of 242 µh/cm$^2$ (per footprint area) was measured for the electrode layer deposited on the 3D substrate. This shows that the capacity for the 3D electrode is about a factor of 20.3 times higher than the capacity of the planar electrode, which is in line with the expected area increase of the micro-pillar array (i.e. about 20.6 times increase). The measured results shown in FIG. 8 further illustrate that this capacity increase is achieved without any significant loss in rate performance. For example, at a rate of 20 C, a capacity of 4.56 µAh/cm$^2$ was measured for the electrode layer deposited on the planar substrate, and a capacity of 89 µAh/cm$^2$ (per footprint area) was measured for the electrode layer deposited on the 3D substrate, which corresponds to a 19.5 times increase of the capacity. This shows that the capacity can effectively be scaled using 3D structures, while maintaining the fast charging characteristics.

Figure 9:
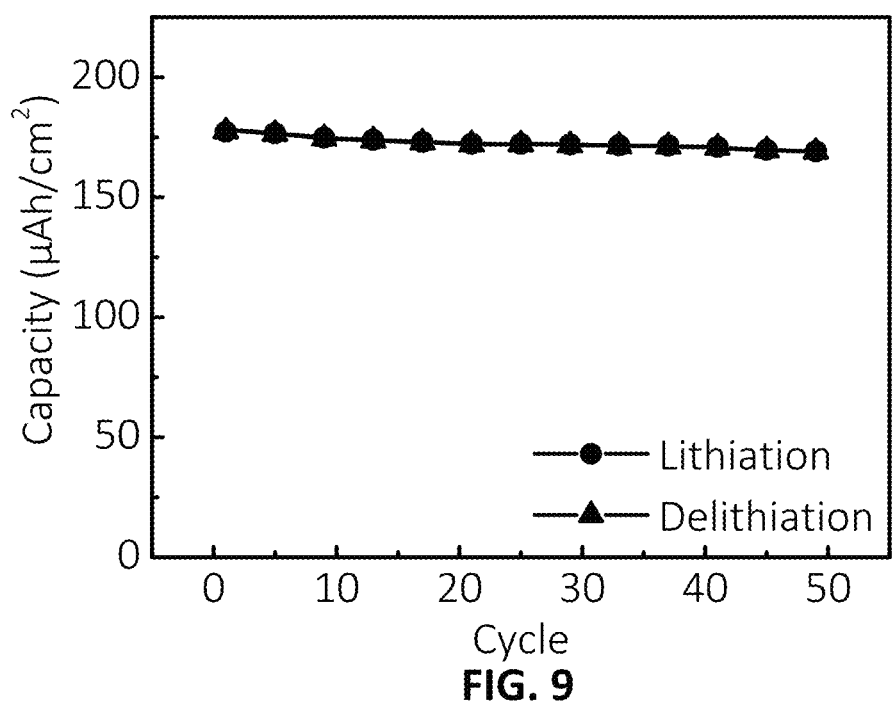
FIG. 9 shows the measured lithiation and delithiation capacity per footprint area as a function of charge/discharge cycles of a 100 nm thick layer of titanium oxide comprising chlorine deposited on silicon micropillars in accordance with a method of the disclosed technology, measured at 2 C (0.53 $mA/cm^2$ per footprint area).

Further, the stability of the electrode layers of titanium oxide comprising chlorine with a ratio Cl/Ti as measured by RBS of 0.09 deposited on the 3D silicon substrate comprising micro-pillars was tested. FIG. 9 shows the lithiation and delihation capacity measured at a rate of 2 C (0.53 mA/cm$^2$ footprint). The capacity at the first cycle is 177 µAh/cm$^2$, of which 95.4% is retained at the 50th cycle. Therefore, it may be concluded that the 3D electrode layer of titanium oxide comprising chlorine with a ratio Cl/Ti as measured by RBS of 0.09 for lithium-ion insertion/extraction is stable and can reversibly insert/extract lithium-ions for many cycles with minimal loss in capacity.

Further Examples

Methods for the Preparation of Planar and Micropillar substrates

Planar substrates: A 200 mm n-type phosphorous doped crystalline Si wafer was coated with 60 nm TiN by physical vapor deposition, diced in 1×1 cm$^2$ pieces and subsequently used as-is for Spatial atomic layer deposition (s-ALD) amorphous TiO$_2$ (am-TiO$_2$) deposition and subsequent electrochemical characterization. TiN was chosen as it functions as current collector and diffusion barrier for lithium into the Si. Growth per cycle determination of the s-ALD am-TiO$_2$ process were performed on am-TiO$_2$ deposited 152 mm Si wafers.

Silicon micropillar substrate: A 300 mm n-type phosphorous doped Si wafer was used for the Si micropillar fabrication. Standard photolithographic patterning, combined with deep reactive ion etching were employed to fabricate the pillar structures. Si micropillar arrays were defined on the 300 mm wafer in 1×1 cm$^2$ squares, with 1 cm spacing in-between the arrays. Pillars were ordered in a square lattice, with a diameter and inter-pillar spacing of 2 µm, and a (nominal) height of 50 µm (see supplementary information for a schematic). A 23 nm TiN current collector was deposited on the pillars by conventional ALD using a plasma based process at 370° C. Planar and micropillar substrates used in SEM and electrochemical characterization were diced in 2×2 cm$^2$ squares (with micropillar array in the center) on which s-ALD deposition was performed.

Structural Characterization

As it will become clear in from the rest of this disclosed technology, experimental results points to aTiO$_{2-y}$Cl$_y$ for the general formula of the titanium oxide comprising chlorine. This is therefore the notation that will be used in the rest of this text for the sake of compacity. The thickness and surface morphology of TiO$_{2-y}$Cl$_y$ films deposited on planar TiN/Si and micropillar substrates were examined with a NOVA 200 (FEI) scanning electron microscope (SEM). The chemical state and content of chlorine in the TiO$_{2-y}$Cl$_y$ layers were determined using X-ray photoelectron spectroscopy (XPS) and Rutherford Backscattering Spectroscopy (RBS). XPS was carried out with the Quantera tool from ULVAC-PHI (Q1). Prior to XPS measurements, surface contaminations of the samples were removed by a 2 minutes sputter clean at 1 keV with Ar$^+$ ions. For RBS measurements, a He$^+$ beam is accelerated to an energy of 1.52 MeV and scattered off the film. The backscattered ions are detected by a time-of-flight energy telescope, which give information on the elemental composition.

Electrochemical Characterization

A custom-made three-electrode polytetrafluoroethylene (PTFE) cell was used which is clamped onto the substrate using a Kalrez® O-ring (exposed surface area of 1.1 and 1.79 cm$^2$ for planar and 3D substrates, respectively) and filled with a liquid electrolyte (10-15 mL). The cell contains two compartments, one compartment comprising a Li metal foil as a counter and the other comprising a Li metal foil as a reference electrode. The compartment with the Li reference electrode was connected to the main compartment through a lugging capillary close to the surface of the working electrode (at ~4 mm). All experiments were performed at room temperature (21° C.) using a LiClO$_4$ in propylene carbonate electrolyte solution. For ease of preparation, an ampoule containing LiClO$_4$ (100 g, battery grade, dry, 99.99%, Sigma Aldrich) was dissolved in propylene carbonate (100 mL, 99.7%, Sigma Aldrich), which leads to a 0.94 M solution. Measurements were done in an Ar filled glove box with O$_2$ and H$_2$O kept below 1 ppm. Electrical contact was made to the samples by scratching the back of the sample and applying a gallium indium eutectic (Alfa Aesar) and contacting with Cu foil. The electrochemical cell was controlled through a PGSTAT101 Autolab (Metrohm) potentiostat/galvanostat, using the Nova 1.10 software. Five cyclic voltammogram (CV) cycles were recorded at 10 mV s$^{-1}$ in the range of 0.1 V to 3.2 V, after which galvanostatic lithiation/delithiation experiments were carried out with cut-off voltages of 3.0 and 0.1 V. Between CVs and lithiation/delithiation experiments, the electrode was relaxed at 3.0 V until a 1/50 C cut-off current was reached. Specifically, for the planar samples, a current of 5, 10, 25, 50, 100, 250, 500, 2.5 and 5 µA was consecutively applied. For the 3D samples, 0.1, 0.2, 0.5, 1, 2 and 5, 0.05 and 0.1 mA were applied in sequence. Long term cycling tests were done using a 3D electrode with TiO$_{2-y}$Cl$_y$ deposited at 100° C./70 ms. Before long term cycling, five CV cycles were recorded at 10 mV s$^{-1}$. Subsequently 1000 lithiation and delithiation cycles at a rate of 10 C, and 5 cycles at 1 C were applied. All voltages are given versus Li$^+$/Li.

Results

Spatial ALD of (Chlorine Doped) Titanium Oxide Films

A rotary type reactor was used which allows up to 152 mm round substrates to be mounted. Precursor inlets are surrounded by exhaust zones and are incorporated in a 150 mm diameter round reactor head situated above the sample. The inlets are surrounded by gas bearing planes, which separate the different reaction zones and prevent precursor intermixing. Gas bearing is formed by flowing pressurized Na through holes located on the gas bearing surface. The sample table can be rotated at different rotation frequencies. The entire construction is mounted in a convection oven which controls the deposition temperature. Depositions were done simultaneously on four 2×2 cm² samples which were mounted on a holder and loaded into the s-ALD reactor. For each deposition run, two planar and two 3D substrates were loaded. The deposition precursors were $TiCl_4$ and $H_2O$, each dosed at 50 sccm and 500 sccm, respectively. The temperature of the precursor bottles was controlled outside the reactor and kept at room temperature for $TiCl_4$ and at 50° C. for $H_2O$. Depositions with 20, 30 and 40 rpm substrate rotation frequencies were performed, which correspond to 140, 90 and 70 ms of gas exposure time at the center of the sample, respectively. Substrate temperatures were fixed at 100, 115 or 130° C., which is low enough to form amorphous $TiO_2$ films. The growth per cycle was determined by spectroscopic ellipsometry with $TiO_2$ layers deposited on full 152 mm Si wafers (data not shown), which, depending on the distance from the center of the wafer, allowed probing several exposure times in the same deposition run. For 100, 115 and 130° C. a growth per cycle of 0.085, 0.080 and 0.075 nm/cycle was determined. Using these values, 1155, 1225 and 1538 rotation cycles were adopted to achieve a 100 for layers deposited at 100° C. and 115° C., irrespective of exposure time. Note that this density is considerably lower than for example bulk anatase $TiO_2$ (~3.8 g cm-2). For deposition at 130° C., a density of 3.3 g cm$^{-3}$ is calculated, which, without being limited by theory, is likely related to overestimation of the Ti content in the closed film due to the agglomerates present on top of the surface. Based on the Ti content and by assuming the reduction of Ti(IV) to Ti(III), a theoretical volumetric capacity of 935 mAh cm$^{-3}$ is calculated both for $TiCl_4$ and TTIP-based $TiO_2$ deposited at 100° C. and 115° C.

Next, the Cl content was analyzed for the different layers deposited with the $TiCl_4$ and TTIP precursor. The highest Cl content ($TiO_{1.912}Cl_{0.088}$) was achieved for the lowest deposition temperature of 100° C. Deposition at 115° C. and 130° C. all lead to lower Cl contents compared to 100° C. For deposition at 115° C., the influence of gas precursor exposure time on Cl content was investigated, which shows that a shorter exposure time leads to more incorporated Cl. Hence, both deposition temperature and exposure time can be used to control the Cl content. For the TTIP-based amorphous $TiO_2$ layers deposited by s-ALD, no Cl was measured as there is no chloride in the precursor.

In Table 1, the Ti content, Cl:Ti atomic ratio, film density and theoretical volumetric capacity as measured by RBS for 100 nm amorphous $TiO_2$ films deposited by S-ALD at different deposition conditions (temperature/exposure time) and gas precursors are presented.

|  | Temperature/ exposure time | Ti content ($10^{23}$ at cm$^{-3}$) | Cl:Ti atomic ratio | Density* (g cm$^{-3}$) | Theoretical vol. capacity (mAh cm$^{-3}$)+ |
|---|---|---|---|---|---|
| $TiCl_4$ + $H_2O$ | 100° C./70 ms | 21 | 0.088 | 2.84 | 935 |
|  | 115° C./70 ms | 21 | 0.074 | 2.84 | 935 |
|  | 115° C./90 ms | 21 | 0.060 | 2.83 | 935 |
|  | 115° C./140 ms | 21 | 0.059 | 2.82 | 935 |
|  | 130° C./90 ms | 25 | 0.064 | 3.31 | 1092 |
| TTIP + $H_2O$ | 100° C./220 ms | 21 | 0 | 2.79 | 935 |

*Based on the $TiO_{2-y}Cl_y$ stoichiometry
+Calculated from the Ti content for the reduction of Ti(IV) to T(III).

nm film, respectively. As a chlorine free reference, am-$TiO_2$ samples were deposited by s-ALD at 100° C. and 10 rpm rotation frequency using titanium tetraisopropoxide (TTIP) and $H_2O$ as precursor. The longer exposure time for TTIP (vs. $TiCl_4$) is needed to ensure self-limiting growth.

The thickness and morphology of the deposited films on planar TiN/Si substrates were determined by scanning electron microscopy (SEM) which showed, smooth, closed and crack-free films for the layers deposited at 100 and 115° C. For the films deposited 130° C., however, some particulate features were visible from SEM (not shown). Because of non-uniformity of the 130° C. $TiO_{2-y}Cl_y$ film and associated difficulties in determining the exact film density (see below), we did not evaluate these further for electrochemical performance.

Chemical Analysis of Chlorine-Doped Titanium Oxide Films

Figure 10:
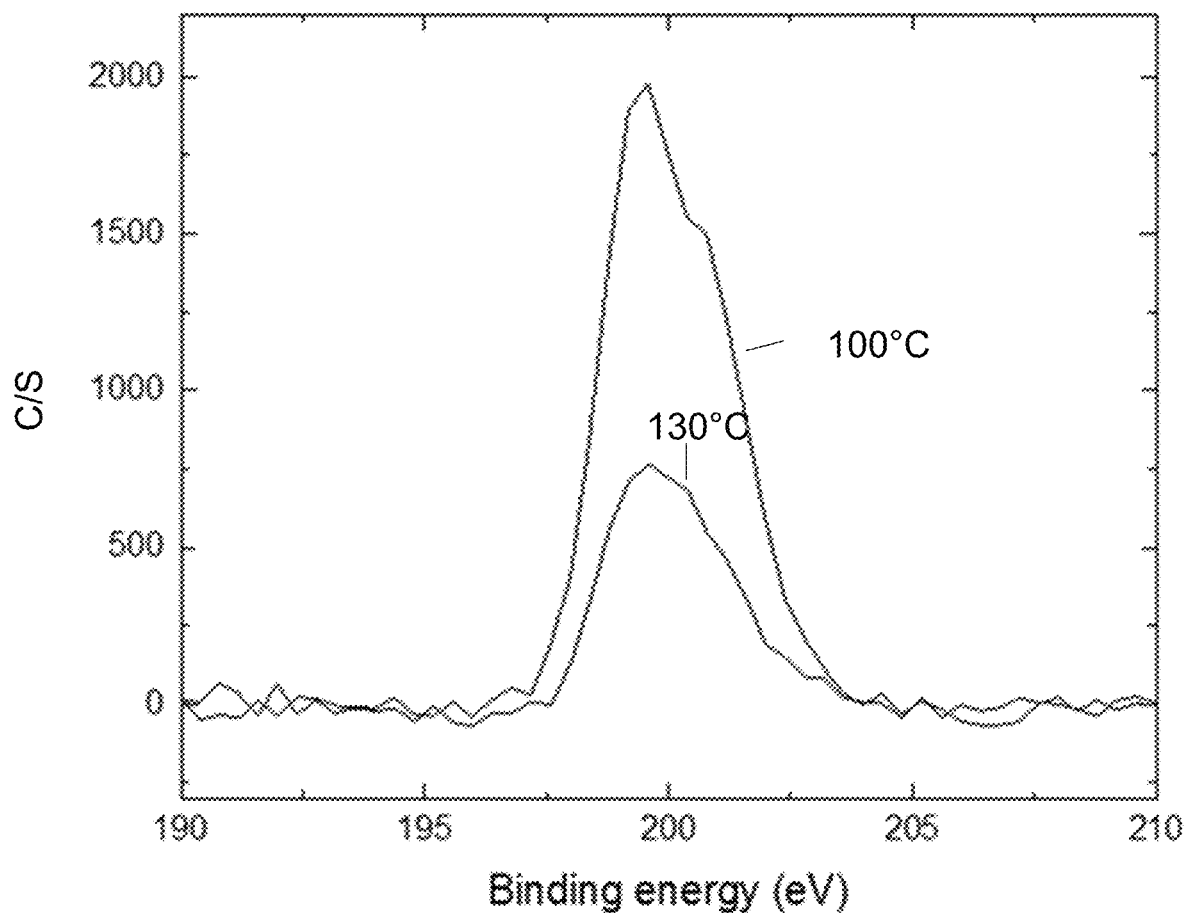
FIG. 10 shows the XPS spectrum in the energy range for Ti—Cl binding of films grown according to embodiments of the disclosed technology.

The stoichiometry of the chlorine doped $TiO_2$ films was measured using Rutherford Backscatter Spectroscopy (RBS). Table 1 gives the results of the Ti content, Cl:Ti atomic ratio and film density for the different deposition conditions. An equal Ti content is measured for depositions performed at 100 and 115° C. (both for $TiCl_4$ and TTIP), whereas the Ti content is higher for 130° C. Based on the $TiO_{2-y}Cl_y$ stoichiometry, a density of 2.8 g cm$^{-3}$ is calculated FIG. 10 shows the XPS spectrum in the energy range for Ti—Cl binding of $TiO_{2-y}Cl_y$ films grown at 100 and 130° C. by s-ALD, with a peak around 199 eV, corresponding to Ti—Cl bonding energy. The shoulder apparent in the spectrum is due to the orbital splitting in 3p3/2 and 3p1/2. For similar layer thicknesses, the amount of chlorine is higher at lower temperatures, in accordance with RBS measurements. This implies that more chlorine is bound to titanium at lower temperatures. Without being limited by theory, several mechanisms can explain the Ti—Cl bond existence in the thin films. Ideal growth of the film would follow the following reaction paths:

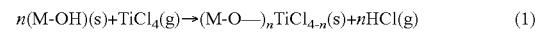

$$n(M\text{-}OH)(s)+TiCl_4(g) \rightarrow (M\text{-}O\text{---})_n TiCl_{4-n}(s)+nHCl(g) \quad (1)$$

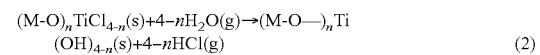

$$(M\text{-}O)_n TiCl_{4-n}(s)+4-nH_2O(g) \rightarrow (M\text{-}O\text{---})_n Ti(OH)_{4-n}(s)+4-nHCl(g) \quad (2)$$

Without being limited by theory, a first possible explanation of the presence of persistent Cl could be an incomplete ligand exchange reaction of —Cl with —OH (Eq. 2). This can happen when the $H_2O$ dose (i.e. combination of $H_2O$ partial pressure and exposure time) is insufficient to lead to a completed reaction. On the other hand, the observed Cl/Ti ratio might be the result of a chemical equilibrium forming at the specific deposition temperature. In this case, increasing the H$_2$O dose would not lead to changes in the Cl/Ti ratio.

More complex mechanisms, like non-growth ligand exchange reactions, can also take place. For example, the following reaction can occur:

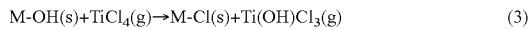

The species formed in this reaction are mobile species that can also migrate on the surface of the material. These species are typically only observed at deposition temperatures of 200° C. and higher. A possible variation could be the competition reaction of gaseous HCl, formed during either H$_2$O or TiCl$_4$ pulse, with surface hydroxyl groups formed:

resulting in the formation of inactive sites for TiCl$_4$ pulse and incorporation of chlorine in the film. A study by Leem et al. shows that addition of a HCl pulse after the TiCl$_4$ pulse to the ALD cycle decreases the thickness of the layer, thus decreasing the number of active sites.

From RBS it is apparent that at increased pulse and purging times (these are related in the current setup) the amount of chlorine incorporated decreases. This hints towards an incomplete ligand exchange reaction, but does not exclude the other possible causes.

Electrochemical Performance of Chlorine-Doped Titanium Oxide Films

Li$^+$-ion insertion/extraction properties of the 100 nm amorphous TiO$_{2-y}$Cl$_y$ films deposited by s-ALD from a TiCl$_4$ and TTIP (am-TiO$_2$) precursor on planar TiN—Si substrates were determined by cyclic voltammetry and galvanostatic charge/discharge experiments, as shown in FIGS. 11A-11D. The fifth cyclic voltammogram (CV) performed at 10 mV s$^{-1}$ and measured between 3.2 and 0.1 V for the different am-TiO$_{2-y}$Cl$_y$ and the am-TiO$_2$ layers is given in FIG. 11A. The current response is clearly dependent on the specific deposition condition of the films and thus the chloride content. The largest overall current density is measured for the TiO$_{1.912}$Cl$_{0.088}$ film (100° C./70 ms) (solid line). For this layer, well defined, broad reduction and oxidation peaks are observed around 1.3 and 1.6 V vs Li$^+$/Li, respectively, which are assigned to the Li$^+$-ion insertion and extraction into the amorphous TiO$_{1.912}$Cl$_{0.088}$ structure. The shape of the CV curve is similar to previously reported nanosized am-TiO$_2$ and to the chlorine free TTIP am-TiO$_2$ reference (long dash line). For the TiCl$_4$-based TiO$_{2-y}$Cl$_y$ films, a lower Cl content leads to less defined reduction peaks with lower current densities. The dash dot line corresponds to a TiO$_{1.926}$Cl$_{0.074}$ film (115° C./70 ms). The dotted line corresponds to a TiO$_{0.940}$Cl$_{0.060}$ film (115° C./90 ms). The short dash line corresponds to a TiO$_{1.941}$Cl$_{0.059}$ film (115° C./140 ms).

Figure 11A:
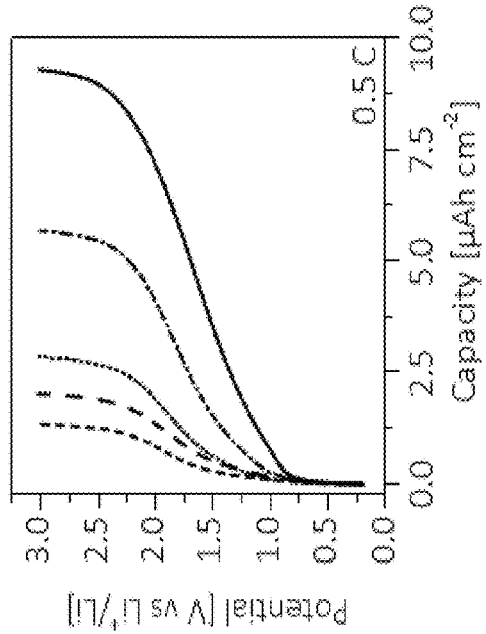
FIGS. 11A-11D show electrochemical characterizations of electrodes prepared according to embodiments of the disclosed technology and of a comparative amorphous $TiO_2$ film.
Figure 11B:
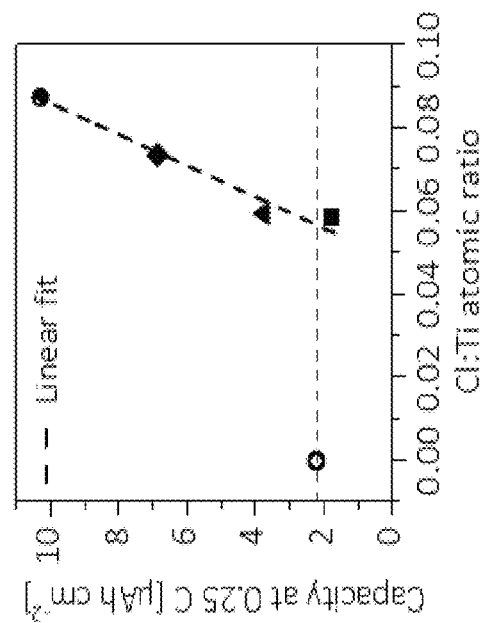

FIG. 11B shows the Galvanostatic charge/discharge experiments and resulting potential vs capacity profiles (constant current delithiation curves) obtained at a rate of 0.5 C (+4.5 µA cm$^{-2}$) for the different TiO$_{2-y}$Cl$_y$ films. The measured capacity strongly depends on the Cl$^-$ content, and the highest capacity is reached for the highest Cl content (y=0.088, solid line). The dash dot line corresponds to a TiO$_{1.926}$Cl$_{0.074}$ film (115° C./70 ms). The dotted line corresponds to a TiO$_{1.940}$Cl$_{0.060}$ film (115° C./90 ms). The short dash line corresponds to a TiO$_{1.941}$Cl$_{0.059}$ film (115° C./140 ms). The long dash line corresponds to a chlorine free TTIP am-TiO$_2$ reference. The voltage-capacity profile is also similar to previous reports on nanosized am-TiO$_2$, and for all samples tested, most delithiation (>65%) occurs between 1 V and 2 V vs Li$^+$/Li. The average coulombic efficiency for all lithiation/delithiation tests across the different C-rates was around 93%. In general, we saw that the rate-performance is limited by the delithiation step, and therefore, the delithiation capacity is shown in what follows.

Figure 11C:
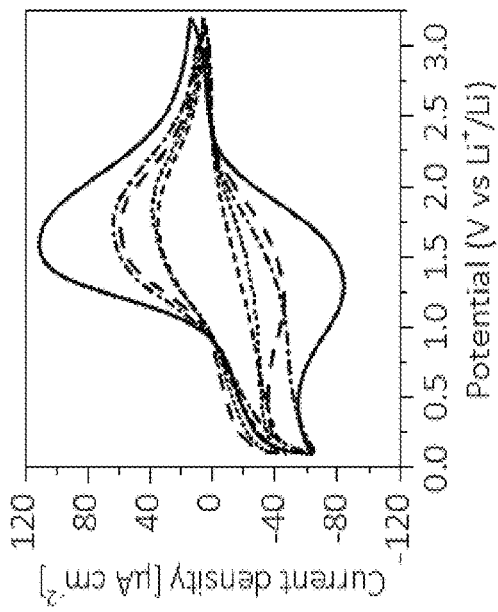

The rate-performance of TiO$_{2-y}$Cl$_y$ films was investigated by applying different C-rates (between 0.25-50 C) in the voltage range of 3.0 to 0.1. The (delithiation) capacity against the C-rate is shown in FIG. 11C. At 0.25 C, capacities of 10.3, 6.8, 3.7 and 1.8 µAh cm$^{-2}$ are obtained for y=0.088 (plain circles), 0.074 (diamonds), 0.060 (triangles) and 0.059 (squares), respectively. Furthermore, the TiO$_{1.912}$Cl$_{0.088}$ layer delivers 330% more capacity than the chlorine free am-TiO$_2$ reference (2.4 µAh cm$^{-2}$, hollow circles). At higher C-rates, the accessible capacity for TiO$_{1.911}$Cl$_{0.088}$ is 83% and 26% of the maximum capacity, at a rate of 1 C and 50 C, respectively.

Figure 11D:
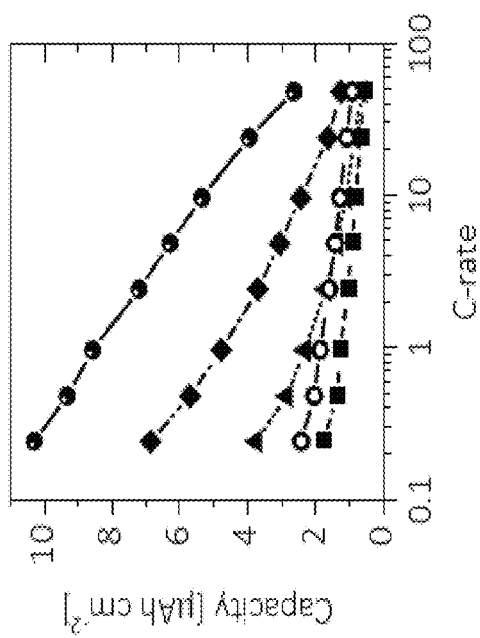

In FIG. 11D, the maximum delithiation capacities obtained at 0.25 C were plotted against the Cl:Ti atomic ratio obtained from RBS. The meaning of the square, triangle, diamond, full and hollow circles is as defined in FIG. 11C. As a reference, the capacity of the Cl-free film is given as well. As shown in FIG. 11D, a linear fit of the capacity vs Cl:Ti atomic ratio was performed (R$^2$=0.95) of the Cl-containing samples. All voltages are given vs Li$^+$/Li. As shown above, the more chlorine, the higher the Li$^+$-ion storage capacity. Interestingly, a linear relationship is found between the Cl:Ti atomic ratio and the maximum capacity which intercepts the capacity of Cl-free am-TiO$_2$ around y=0.06. Hence, for enhancement in maximum capacity, a composition of TiO$_{2-y}$Cl$_y$ with y>0.06 is advantageous.

For y=0.09 an enhancement of 5 times the capacity of the Cl-free am-TiO$_2$ is obtained. At this point, no saturation is yet seen and further enhancement could be possible for even higher Cl-content. A decrease of deposition temperature below 100° C. could in principle increase the Cl-content. However, 100° C. is currently near the limit of the self-limited ALD process.

Normalizing the maximum delithiation capacity of the film with highest Cl content (Ti$_{01.912}$Cl$_{0.088}$) to its weight determined from the film thickness and RBS density, leads to a gravimetric capacity of 362 mAh g$^{-1}$ at 0.25 C. Interestingly, this value is higher than that expected for insertion of 1 Li per TiO$_2$ (=336 mAh g$^{-1}$). This suggests that a fraction (~10%) of Ti(III) can be reversibly reduced to Ti(II). Thermodynamically, the reduction of Ti(III) to Ti(II) in crystalline TiO$_2$ is possible from a potential of 0.37 V vs Li$^+$/Li. However, it is thought to be kinetically inaccessible and to our knowledge only observed once for the case of small titania nanoparticles (<10 nm) coated with Li metal.

Without being limited by theory, the present results suggest that further reduction to Ti(II) in sub-micron thick am-TiO$_2$ films can be obtained by doping with chlorine.

Figure 12:
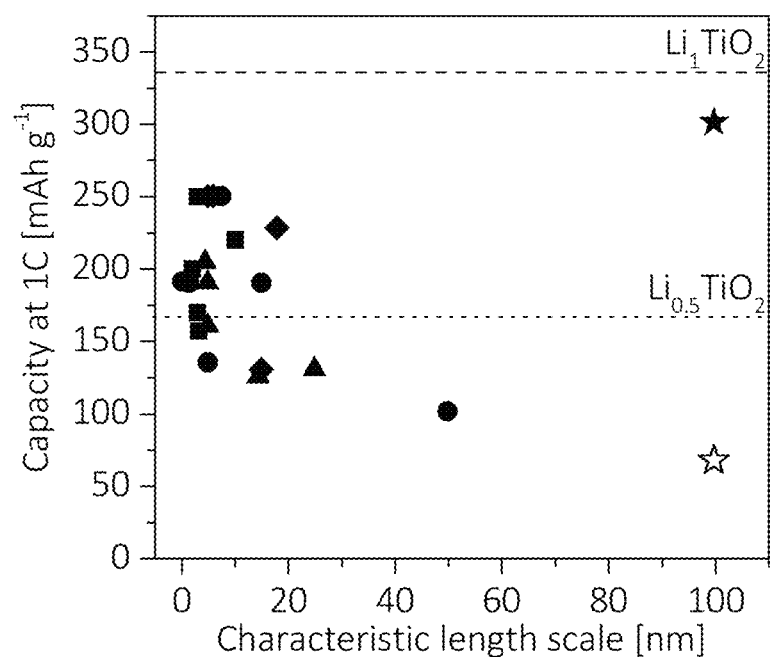
FIG. 12 shows the storage capacity of an electrode according to embodiments of the disclosed technology and of comparative electrodes.

In FIG. 12, we compare the gravimetric storage capacity at 1 C (=336 mAg-1) of the best performing chlorine doped am-TiO$_2$ (TiO$_{1.912}$Cl$_{0.088}$, full star) of the disclosed technology and the Cl-free am-TiO$_2$ electrode with nanoscaled TiO$_2$ electrodes reported in the prior art. The prior art gravimetric storage capacity at 1 C present in FIG. 12 are derived from the following references: M. J. Sussman et al., Chem. Eng. 2015, 3, 334; G. Lui et al., Nano Energy 2016, 24, 72; B. Wang et al., ChemNanoMat 2015, 1, 96; K. Saravanan et al., Energy Environ. Sci. 2010, 3, 939; J. Ye et al., ACS Nano 2015, 9, 2194; Y. Shen et al., Nanoparticle Res. 2013, 15, 1913; Z. Jin et al., Nanotechnology 2014, 25, 395401; J. Cheng et al., J. Mater. Chem. A 2014, 2, 2701; X. Xin et al., ACS Nano 2012, 6, 11035; J. Liu et al, Adv. Mater. 2011, 23, 998; N. Li et al, Adv. Funct. Mater. 2011, 21, 1717; H. Yang et al., J. Power Sources 2015, 288, 401; Y. Zhang et al. ACS Appl. Mater. Interfaces 2014, 6, 4458; M. Samiee et al., J. Power Sources 2014, 245, 594; W. Li et al., Chem. Mater. 2015, 27, 5014; J.-Y. Shin et al., J. Mater, Chem. Mater. 2012, 24, 543; M. Li et al., Electrochem. commun. 2015, 57, 43; M. Xie et al, J. Electrochem. Soc. 2015, 162, A974; H. Xiong et al., J. Phys. Chem. C 2012, 116, 3181; X. H. Wang et al., J. Mater. Chem. A 2015, 3, 15394.

The squares are anatase nanostructures; the diamonds are amorphous $TiO_2$; the circles are Anatase/C-composites; the triangles are doped anatase; the full star is $TiO_{1.912}Cl_{0.088}$ according to an embodiment of the disclosed technology; the hollow star is TTIP am-$TiO_2$ as prepared in the disclosed technology. To compare the different nanostructures (thin-films, nanoparticles and nanotubes), the typical distance for Li-ion diffusion into these nanostructures was taken, which is: the film thickness for $TiO_2$ films, the radius for particles, half of the wall thickness for nanotubes. At a rate of 1 C, our 100 nm amorphous $TiO_{1.912}Cl_{0.088}$ film delivers 20% more capacity (301 mAh $g^{-1}$) than the best performing nanosized electrode (250 mAh $g^{-1}$ for am-$TiO_2$ nanotubes with 10 nm tube wall thickness). Furthermore, at 50 C, our amorphous $TiO_{1.912}Cl_{0.088}$ achieves 92 mAh $g^{-1}$, still outperforming the nanosized based $TiO_2$ electrodes, except the am-$TiO_2$ nanotubes.

Without being limited by theory, our hypothesis for the enhanced capacity and excellent rate-performance is based on the enhancement of both the ionic and electronic conductivity. The enhanced electronic conductivity can be explained by permanent presence of Ti(III) states after substitution of $O^{2-}$ by $Cl^-$ in $TiO_2$. It is known that the presence of Ti(III) increases the electronic conductivity, which enhances the rate-performance and in turn the accessible capacity. Note that the introduction of permanent Ti(III) by doping may go at the cost of maximum capacity. However, in our case, an increase in capacity was observed for up to 9% Ti(III)(xCl=0.088) without any loss in accessible capacity. On the contrary, the maximum capacity was still increasing and exceeds that for complete reduction of Ti(IV) to Ti(III), especially when taking into account that only ~90% of the Ti is available as Ti(IV) (i.e. ~302 mAh $g^{-1}$ for $Li_{0.9}TiO_{1.91}Cl_{0.09}$). Under this assumption, about 17% of Ti(II) is formed at maximum capacity of 362 mAh $g^{-1}$. The ionic conductivity of $Li^+$ is also known to be higher for amorphous $TiO_2$ than for crystalline $TiO_2$; Li-ion diffusion coefficients is of the order of $3.5 \times 10^{-12}$ cm$^2$ s$^{-1}$ for amorphous and of the order of $~1 \times 10^{-14}$ cm$^2$ s$^{-1}$ for anatase. The fact that a significant fraction of Ti(II) can be formed indicates excellent access of $Li^+$ ions in the Cl-doped material. The larger ionic radius of chloride compared to oxygen creates somewhat wider "channels" for $Li^+$ to diffuse. Furthermore, the change in local ionic charge distribution might reduce the coulombic repulsion, enabling Ti(II) formation and lithium insertion of more than 1 $Li^+$ per Ti.

Note that lithiation and delithiation mechanism for amorphous $TiO_2$ (and $TiO_{2-yCly}$ in our case) is different than for anatase $TiO_2$, which leads to absence of a "voltage plateau" for amorphous $TiO_2$ (see FIG. 11B). Such a plateau is typically the result of a first order phase transition between Li-rich and Li-poor domains. The amorphous structure likely suppresses such a transition from occurring and allows for a continuous insertion of $Li^+$-ion across a wider potential range. In the case of anatase $TiO_2$, an orthorhombic $Li_{0.6}TiO_2$ phase is formed which leads to orders of magnitude decrease in the $Li^+$-ion diffusion coefficient, blocking further lithiation. The disordered amorphous structure of $TiO_2$ likely allows for more facile $Li^+$-ion diffusion as more random pathways are accessible within the material. It can be debated whether a sloped potential response is less desired than a potential plateau in full battery cell, but one benefit is the capability to determine the state of charge by directly measuring the cell voltage. Also, the average delithiation potential of $TiO_{1.911}Cl_{0.088}$ is 1.65 V vs $Li^+/Li$ (measured at 1 C), which is 0.25 V below the delithiation potential of anatase $TiO_2$ (~1.9 V). Since titania is considered as negative electrode in the Li-ion battery, the lower delithiation potential will result in a higher energy density during discharge.

Demonstration of Cl-Doped Amorphous Titanium Oxide as 3D Thin-Film Electrode

Figure 13A:
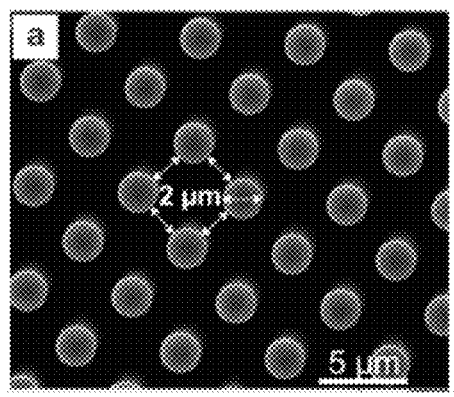
FIGS. 13A-13C show SEM micrographs.
Figure 13B:
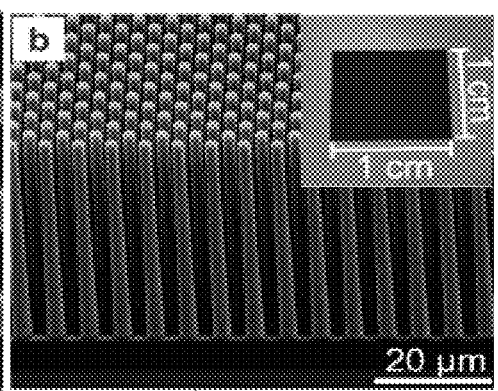
Figure 13C:
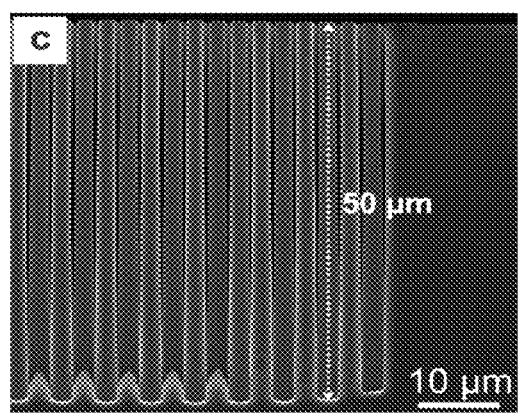

To enable small autonomous devices, integrated energy storage is needed that offers a small footprint and fast charging capabilities. A battery envisioned for this, is the three-dimensional (3D) all-solid-state thin-film battery. Key to its practical implementation, are cost-efficient conformal coating techniques and high rate-performance electrode materials. There are several benefits of integrating Cl-doped am-$TiO_2$ thin-films deposited by S-ALD in all-solid-state 3D batteries. First, the relatively low deposition temperature (<150° C.) is advantageous for fabrication of a full 3D battery stack, as it prevents crystallization or oxidation of underlying layers or current collector. For example, the amorphous LIPON solid-electrolyte crystallizes above 360° C., which leads to orders of magnitude decrease in the room temperature ionic conductivity and must therefore be prevented. Second, absence of crystallites for Cl-doped am-$TiO_2$ gives rise to smooth layers which ensure a good interface with the solid-electrolyte and integrity of the whole stack. Last, S-ALD offers a unique opportunity to deposit high-quality and self-limiting films at much higher deposition rates than conventional ALD. To demonstrate Cl-doped am-$TiO_2$ deposited by s-ALD as a 3D thin-film electrode, 100 nm $TiO_{2-y}Cl_y$ was deposited on TiN-coated silicon micropillars. The Si micropillars were fabricated by photolithographic patterning and deep reactive ion etching and are arranged in a square lattice. The pillars are about 50 µm tall and have a diameter and spacing of 2 µm, as shown in the SEM micrographs of FIGS. 13A-13C. FIG. 13A is a top-view of uncoated pillars; FIG. 13B is a tilted-top view of Cl-doped amorphous titanium oxide coated pillars and FIG. 13C is a cross-section images thereof. The inset shows a digital photograph image of the 1×1 cm$^2$ Si micropillar array.

The 3D structure offers an area enhancement factor (AEF) of about 21 to 25× on which different $TiO_{2-y}Cl_y$ s-ALD deposition conditions were tested.

Figure 14B:
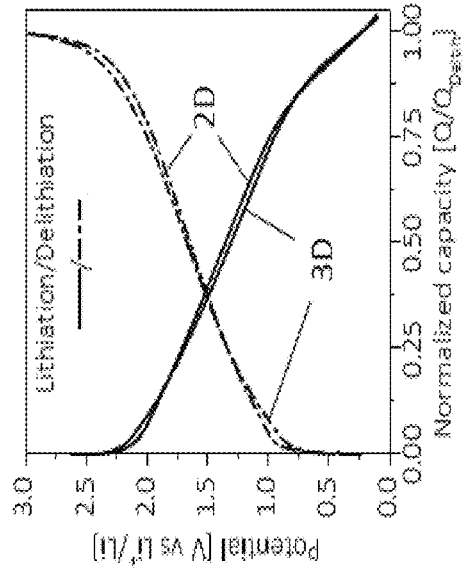
FIGS. 14A-14C show electrochemical characteristics of planar electrodes compared to 3D electrodes according to embodiments of the disclosed technology.
Figure 14A:
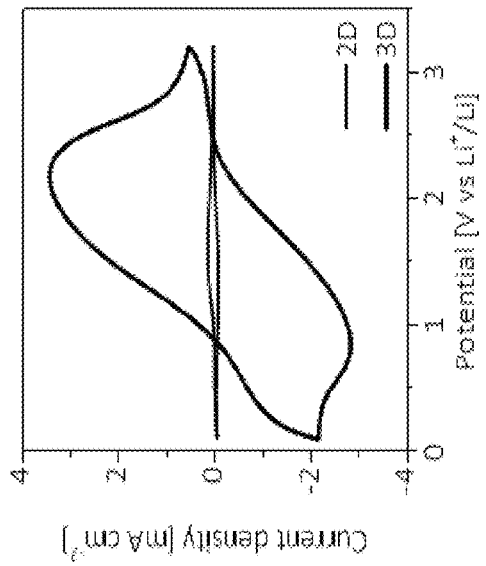
Figure 14C:
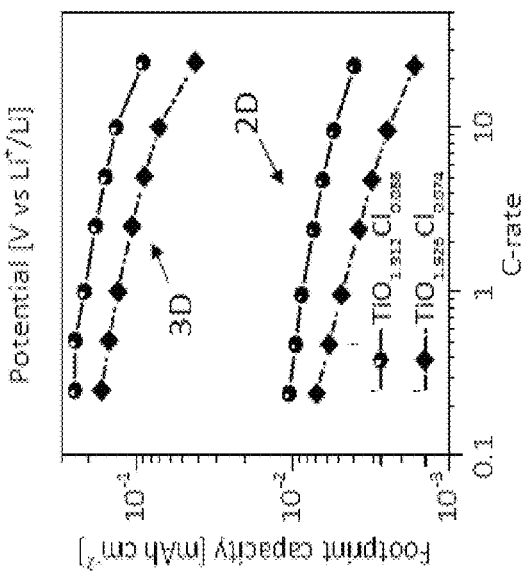

FIGS. 14A-14C give the electrochemical results of planar (2D) and microstructured (3D) $TiO_{2-y}Cl_y$ electrodes in 1 M $LiClO_4$ in PC deposited at different deposition conditions. FIG. 14A shows the cyclic voltammograms recorded at 10 mVs$^{-1}$ for the 2D and 3D electrodes deposited at 100° C. and 70 ms exposure time which corresponds to a composition of $TiO_{1.912}Cl_{0.088}$ for the planar substrates. The shape of the reduction and oxidation peaks for the 3D sample are similar to that of the planar sample (see also FIG. 11A). The peak potentials are somewhat shifted as expected for the larger ohmic drop. The peak current density of the 3D electrode shows a 30-fold increase compared to the planar one, which is in range of what is expected only from the area enhancement.

FIG. 14B shows the capacity-potential profiles for the 2D and 3D electrodes measured at constant current of 1 C (9 and 200 µA cm$^{-2}$ for 2D and 3D, respectively). To easily compare the lithiation and delithiation characteristics, the measured capacities are normalized by their respective maximum delithiation capacities reached at the cut-off of 3.0 V and measured at 0.25 C. The good matching of the potential profiles for the 2D and 3D electrodes, indicates that the 3D coating is similar in thickness and Cl-content. FIG. 14C compares the (delithiation) footprint capacities of 2D and 3D $TiO_{2-y}Cl_y$ electrodes with y=0.088 and y=0.074 at different C-rates. The highest footprint capacity is again found for the highest Cl content; a footprint capacity of 242 and 164 $\mu Ah\ cm^{-2}$ is reached at 0.25 C for y=0.088 and y=0.074, respectively. For both Cl contents, the capacity of the 3D electrodes is exactly 24 times that of the 2D electrode, in line with the AEF. Moreover, the 3D electrodes have the same trend in capacity against C-rate as the planar electrodes, showing that the rate performance is comparable as expected for the same film thickness. Specifically, the best performing 3D electrode ($TiO_{1.912}Cl_{0.088}$) can access 87% (211 $\mu Ah\ cm^{-2}$) and 37% (89 $\mu Ah\ cm^{-2}$) of its maximum capacity at 1 and 20 C, respectively. This is similar to the percentage of accessible capacity for the planar sample and shows that the planar capacity can effectively be enhanced by 3D structuring, while preserving the same rate-performance.

The cycling stability of the 3D $TiO_{1.912}Cl_{0.088}$ electrode was investigated for over 1000 constant current lithiation/delithiation cycles (not shown). First, a rate of 10 C was applied for 1000 cycles, after which 1 C was applied for 5 cycles. A cut-off potential of 3.0 and 0.1 V vs $Li^+/Li$ was used for the constant current experiments. For the first 30 cycles (at 10 C), the footprint capacity increased slightly from 133 $\mu Ah\ cm^{-2}$ to about 140 $\mu Ah\ cm^{-2}$, and remained constant for the subsequent 970 cycles. Hence, no loss in capacity during 1000 cycles at 10 C is observed for the Cl-doped amorphous $TiO_2$ films. The average delithiation/lithiation coulombic efficiency for the complete cycling experiment was 99.96%. The first cycle measured at 10 C had a coulombic efficiency of 83.4%, and the first cycle at 1 C had a coulombic efficiency of 111.2%. This suggests that during the first cycle, a certain amount of lithium was trapped which was later recovered at a lower C-rate. Hence, the 3D Cl-doped $TiO_2$ electrode can reversibly insert/extract lithium for over 1000 cycles with no loss in capacity and high coulombic efficiency.

Comparison of the 3D Cl-doped amorphous titanium oxide electrodes with $TiO_2$ thin-film electrodes found in the literature.

Figure 15A:
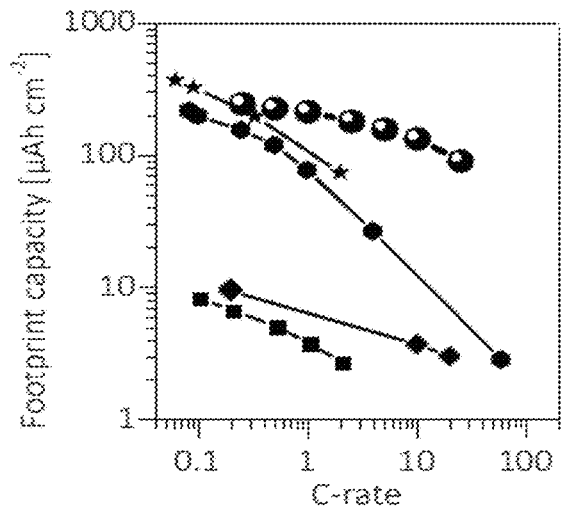
FIGS. 15A-15C compare the footprint capacity (FIG. 15A), the active material capacity (FIG. 15B), and the 3D electrode capacity of electrodes (FIG. 15C) according to embodiments of the disclosed technology with comparative electrodes.
Figure 15B:
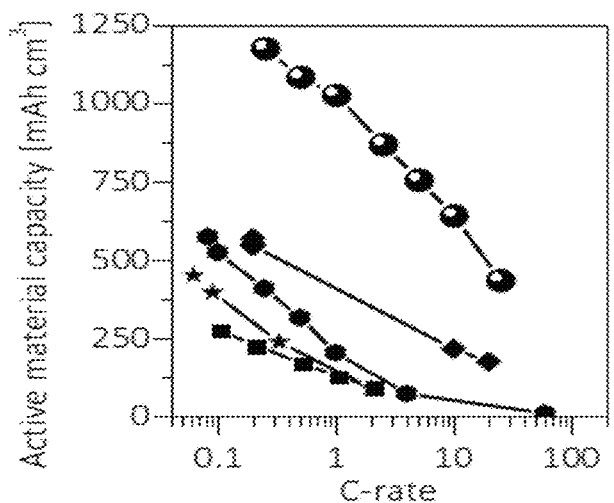
Figure 15C:
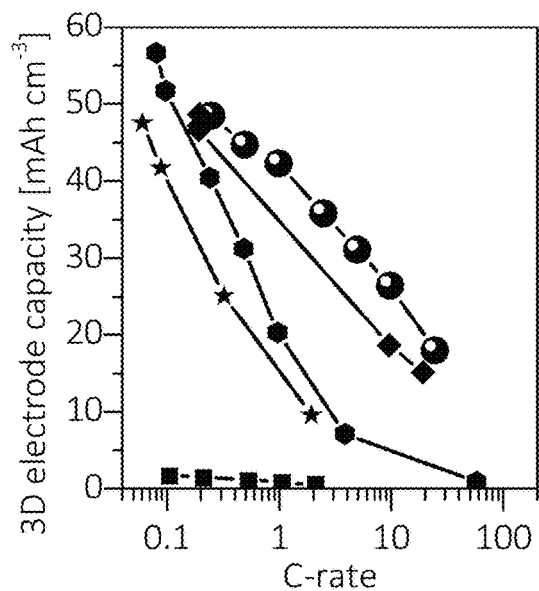

To benchmark our best performing 3D $TiO_{2-y}Cl_y$ electrode, we compared its rate-performance with 3D $TiO_2$ thin-film electrodes found in literature. Specifically, we chose 3D current collector designs which have a periodic structure with sufficient spacing for conformal deposition of the complete thin-film battery stack (both positive and negative electrodes separated by solid-state-electrolyte). For this reason, reports on, for example, $TiO_2$/carbon composites, or $TiO_2$-coated nanoporous Au have been omitted. FIGS. 15A-15C summarize the capacities obtained for $TiO_2$ thin-film electrodes on silicon micropillars (J. Xie et al, J. Electrochem. Soc. 2016, 163, A2385), silicon microtubes (E. Eustache et al., Adv. Energy Mater. 2014, 4, 1301612; M. Létiche et al., Adv. Energy Mater. 2016, 201601402, 1601402) and aluminum nanorods (S. K. Cheah, Nano Lett. 2009, 9, 3230), conformal deposited by ALD (E. Eustache et al; M. Létiche et al.; S. K. Cheah et al.) and CVD (J. Xie et al.). Note that the CVD anatase films of J. Xie et al. were deposited on the same Si micropillar arrays as used in this work. Three different properties related to the electrode performance have been examined. FIG. 15A illustrates the footprint capacity. FIG. 15B illustrates the active material capacity. And FIG. 15C illustrates the 3D electrode volumetric capacity.

The circles stand for a 150 nm $TiO_2$ anatase deposited by ALD on Si microtubes (E. Eustache et al.); the squares stand for 40 nm $TiO_2$ anatase deposited by low pressure chemical vapour deposition (LPCVD) on Si micropillars (J. Xie et al.); the stars stand for 155 nm $TiO_2$ anatase/lIPO deposited by ALD on Si microtubes (M. Létiche et al.); the diamonds stand for 17 nm $TiO_2$ anatase/amorphous deposited by ALD on Al nanorods (S. K. Cheah et al.); and the circles stand for 100 nm Cl-doped amorphous titanium oxide on Si micropillars according to an embodiment of the disclosed technology.

FIG. 15A compares the footprint capacity of the different 3D $TiO_2$ thin-film electrodes at different C-rates (taken as reported). At the low rate of 0.06 C, the highest footprint capacity of 370 $\mu Ah\ cm^{-2}$ is obtained for Si microtube arrays coated with a Pt current collector and 155 nm anatase $TiO_2/Li_3PO_4$ (LIPO). The reported Si microtube structure gives an AEF of about 53× which corresponds with an "equivalent" $TiO_2$ thickness of around 8.2 µm and is over four times that of our 3D $TiO_2$ on Si micropillar arrays (AEF ~21× and effective film thickness of 100 nm). However, a high footprint capacity and fast charging is very advantageous for applications where the surface area for energy storage is limited and recharge needs to be quick, for example in health monitoring devices. Indeed, a main advantage claimed for 3D thin-film batteries is their fast charging capability. As shown in FIG. 15A, above 1 C however, the capacity of the 3D Si microtube-based electrodes fades quickly and retain less than 10 $\mu Ah\ cm^{-2}$ for C-rates higher than 10 C. In contrast, our fast kinetics 3D Cl-doped am-$TiO_2$ electrodes retains a footprint capacity larger than 100 $\mu Ah\ cm^{-2}$ up to 10 C; i.e. at least 10 times better than all other 3D $TiO_2$ electrodes.

FIG. 15B gives the volumetric capacities (capacity per active material volume) of the $TiO_2$ active material for different C-rates. This value was obtained by dividing the footprint capacity by the equivalent $TiO_2$ thickness (=AEF× effective $TiO_2$ film thickness). Across all C-rates, our 3D $TiO_{1.912}Cl_{0.088}$ electrode delivers the highest volumetric capacity. This high volumetric capacity explains why a thinner $TiO_2$ film (100 nm $TiO_{1.912}Cl_{0.088}$ versus 155 nm anatase) on a 3D structure with only half the area enhancement (AEF of 21× versus 53×) still had similar footprint capacity.

Finally, we also analyzed the volumetric capacity of the complete 3D architecture denoted as "3D electrode capacity". This value was obtained by dividing the footprint capacity by the pillar or microtube height. The 3D electrode capacity gives an indication of the volumetric capacity of the final energy storage device (disregarding packaging and substrate support). A successful 3D electrode design will maximize the volume of the $Li^+$-ion insertion material while minimizing the volume of the 3D current collectors (and solid-state electrolyte). FIG. 15C shows the 3D electrode capacity for the different 3D $TiO_2$ electrodes. At a low C-rate of 0.08 C, the best 3D electrode capacity (57 $mAh\ cm^{-3}$) is obtained for the Si microtube electrode coated with 150 nm anatase $TiO_2$ (AEF of 25×). However, similar to the results from FIGS. 15A-15B, from the rate of 0.25 to 25 C, the 3D amorphous $TiO_{2-y}Cl_y$ electrode has the highest 3D volumetric capacity.

The foregoing description details certain embodiments of the disclosed technology. It will be appreciated, however, that no matter how detailed the foregoing appears in text, the disclosed technology may be practiced in many ways. It should be noted that the use of particular terminology when describing certain features or aspects of the disclosed technology should not be taken to imply that the terminology is being re-defined herein to be restricted to including any specific characteristics of the features or aspects of the disclosed technology with which that terminology is associated.

What is claimed is:

1. A negative electrode of an ion insertion battery cell comprising a negative electrode layer, wherein the negative electrode layer comprises a material formed of titanium oxide comprising chlorine, wherein the titanium oxide comprising chlorine comprises an amorphous titanium oxide comprising chlorine or a mixture comprising the amorphous titanium oxide comprising chlorine and a crystalline titanium oxide comprising chlorine.

2. The negative electrode according to claim 1, wherein a ratio of chlorine to titanium in the negative electrode layer is from 0.01 to 0.1, when measured by Rutherford backscattering spectrometry.

3. The negative electrode according to claim 2, wherein the ratio of chlorine to titanium in the negative electrode layer is from 0.06 to 0.09.

4. The negative electrode according to claim 1, wherein the titanium oxide comprising chlorine has the formula $TiO_{2-y}Cl_y$, wherein y is from 0.01 to 0.1.

5. The negative electrode according to claim 4, wherein the y is from 0.06 to 0.09.

6. The negative electrode according to claim 1, wherein the negative electrode layer has a thickness between 5 nm and 2 μm.

7. The negative electrode according to claim 1, wherein the negative electrode layer is a thin-film electrode layer.

8. The negative electrode according to claim 1, wherein the negative electrode layer is a particle-based electrode layer.

9. An ion insertion battery cell comprising the negative electrode according to claim 1.

10. An ion insertion battery comprising at least one of the ion insertion battery cell according to claim 9.

11. A method of forming a negative electrode of an ion insertion battery cell, the method comprising:

depositing a thin film of titanium oxide comprising chloride on a substrate by an atomic layer deposition process using $TiCl_4$ and $H_2O$ as precursors at a deposition temperature between 50° C. and 150° C., wherein depositing is such that the titanium oxide comprising chlorine comprises an amorphous titanium oxide comprising chlorine or a mixture comprising the amorphous titanium oxide comprising chlorine and a crystalline titanium oxide comprising chlorine.

12. The method according to claim 11, wherein depositing the thin film of titanium oxide comprises depositing the thin film on a non-planar substrate.

13. A method of fabricating an ion insertion battery cell, wherein the method comprises forming the negative electrode according to the method of claim 11.

14. The method according to claim 13, wherein forming the negative electrode comprises depositing the thin film titanium oxide comprising chlorine on a layer stack comprising a positive electrode layer and an electrolyte layer.

15. A method for fabricating an ion insertion battery comprising at least one ion insertion battery cell, the method comprising fabricating the ion insertion battery cell according to the method of claim 13.

16. The method according to claim 14, wherein the electrolyte layer comprises one or both of LiPON and $Li_2S$—$P_2S_5$.

17. The method according to claim 11, wherein the deposition temperature is in the range between 50° C. and 130° C.

18. The method according to claim 11, further comprising annealing the titanium oxide comprising chlorine at about 300° C. to transform the thin film into a crystalline state.

19. The method according to claim 11, wherein the titanium oxide comprising chlorine is amorphous, and the amorphous titanium oxide comprising chlorine does not crystallize.

20. The method according to claim 11, wherein depositing the thin film of titanium oxide comprising chloride comprises spatially separating exposures of the substrate to different precursors by moving the substrate between spatially separated different zones for the different exposures.

* * * * *

UNITED STATES PATENT AND TRADEMARK OFFICE
CERTIFICATE OF CORRECTION

Page 1 of 2

PATENT NO. : 10,862,101 B2
APPLICATION NO. : 16/238455
DATED : December 8, 2020
INVENTOR(S) : Sebastien Moitzheim et al.

It is certified that error appears in the above-identified patent and that said Letters Patent is hereby corrected as shown below:

On the Title Page

In Column 1, item (73), Assignees, Line 3, delete "Nedarlandse" and insert --Nederlandse--.

On page 2, in Column 1, item (56), Other Publications, Line 24, delete "TiO₂nanoplatelets" and insert --TiO$_2$ nanoplatelets--.

On page 2, in Column 2, item (56), Other Publications, Line 28, delete "TiO$_{2-8}$" and insert --TiO$_{2-\delta}$--.

On page 2, in Column 2, item (56), Other Publications, Lines 35-36, delete "BatteriesBatteries" and insert --Batteries--.

On page 2, in Column 2, item (56), Other Publications, Line 48, delete "Litium" and insert --Lithium--.

In the Specification

In Column 9, Line 55, delete "(e.g" and insert --(e.g.,--.

In Column 10, Line 64, delete "Li$_{2.88}$PO$^{3.73}$N0.14)," and insert --Li$_{2.88}$PO$_{3.73}$N$_{0.14}$),--.

In Column 11, Line 32, delete "0.01≤y<0.1." and insert --$0.01 \leq y \leq 0.1$.--.

In Column 11, Line 34, delete "0.01≤y<0.1." and insert --$0.01 \leq y \leq 0.1$.--.

In Column 14, Line 53, delete "1280" and insert --~ 1280--.

In Column 15, Line 41, delete "µh/cm$^2$" and insert --µAh/cm$^2$--.

In Column 17, Line 12, delete "µh/cm$^2$" and insert --µAh/cm$^2$--.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,862,101 B2

In Column 17, Line 33, delete "delihation" and insert --delithiation--.

In Column 19, Line 5, delete "Na" and insert --$N_2$--.

In Column 20, Line 3, delete "cm-2)." and insert --$cm^{-2}$).--.

In Column 21, Line 42, delete "$Li^-/Li$," and insert --$Li^+/Li$,--.

In Column 21, Line 51, delete "$TiO_{0.940}Cl_{0.060}$" and insert --$TiO_{1.940}Cl_{0.060}$--.

In Column 23, Line 56, delete "$TiO_{2-y}Cl_y$" and insert --$TiO_{2-y}Cl_y$--.